US010352505B2

(12) United States Patent
McDowell et al.

(10) Patent No.: US 10,352,505 B2
(45) Date of Patent: Jul. 16, 2019

(54) METHOD AND APPARATUS FOR REAL TIME ENHANCING OF THE OPERATION OF A FLUID TRANSPORT PIPELINE

(71) Applicant: ExxonMobil Research and Engineering Company, Annandale, NJ (US)

(72) Inventors: Keith C. McDowell, Montgomery, TX (US); Jacques A. Cibils, Houston, TX (US)

(73) Assignee: ExxonMobil Research and Engineering Company, Annnandale, NJ (US)

(*) Notice: Subject to any disclaimer, the term of this patent is extended or adjusted under 35 U.S.C. 154(b) by 122 days.

(21) Appl. No.: 15/269,328

(22) Filed: Sep. 19, 2016

(65) Prior Publication Data
US 2017/0003200 A1 Jan. 5, 2017

Related U.S. Application Data

(63) Continuation-in-part of application No. 14/313,267, filed on Jun. 24, 2014, which is a continuation of
(Continued)

(51) Int. Cl.
F17D 5/06 (2006.01)
G01M 3/28 (2006.01)

(52) U.S. Cl.
CPC ............. F17D 5/06 (2013.01); G01M 3/2815 (2013.01); Y10T 137/0318 (2015.04); Y10T 137/0452 (2015.04)

(58) Field of Classification Search
CPC ......... F17D 5/06; G01M 3/26; G01M 3/2815; G08B 21/18
See application file for complete search history.

(56) References Cited

U.S. PATENT DOCUMENTS 4,144,743 A 3/1979 Covington et al.
4,609,994 A * 9/1986 Bassim ................. G01N 29/14
702/39
(Continued)

FOREIGN PATENT DOCUMENTS

WO 03/046503 A 11/2007
WO 2007/128657 A 11/2007
(Continued)

OTHER PUBLICATIONS

Chinese Patent Application No. 200980133107.0, Office Action, dated Feb. 29, 2012.
(Continued)

Primary Examiner — Hongmin Fan
(74) Attorney, Agent, or Firm — Glenn T. Barrett

(57) ABSTRACT

A real time method and dynamic logic-based system for enhancing the operation of a pipeline network is disclosed. The system and method perform monitoring of the operation of a pipeline network, generate alarms in response to differing levels of destabilized pipeline operations, manage the generation of alarms based upon known operating events and operating conditions, diagnose potential source of the detected destabilized events and manage the operation of the pipeline.

12 Claims, 19 Drawing Sheets

Related U.S. Application Data application No. 12/492,564, filed on Jun. 26, 2009, now Pat. No. 8,766,806.

(60) Provisional application No. 61/129,466, filed on Jun. 27, 2008.

(56) References Cited

U.S. PATENT DOCUMENTS

| | | | |
|---|---|---|---|
| 4,796,466 A | 1/1989 | Farmer | |
| 5,361,622 A | 11/1994 | Wall | |
| 5,388,445 A * | 2/1995 | Walters | G01M 3/243 73/40.5 R |
| 5,428,989 A | 7/1995 | Jerde et al. | |
| 5,708,193 A | 1/1998 | Ledeen et al. | |
| 6,389,881 B1 | 5/2002 | Yang | |
| 6,668,619 B2 | 12/2003 | Yang | |
| 6,970,808 B2 | 11/2005 | Abhulimen | |
| 7,500,489 B2 | 3/2009 | Folkers | |
| 9,797,799 B2 * | 10/2017 | Zhang | G01M 3/2807 |
| 2002/0124633 A1 | 9/2002 | Yang et al. | |
| 2005/0279169 A1 | 12/2005 | Lander | |
| 2007/0043807 A1 | 2/2007 | Twitchell, Jr. | |

FOREIGN PATENT DOCUMENTS

| | | | |
|---|---|---|---|
| WO | 2009158602 A1 | 12/2009 | |
| WO | 2016038527 A1 | 3/2016 | |
| WO | WO 2016/038527 | * | 3/2016 |

OTHER PUBLICATIONS

Singapore Patent Application No. 201009304-5, Office Action, dated May 4, 2012.

Hagar, et al., "New Plot-Tracing Screen Display Avoids Controller Data Overload", Pipe Line & Gas Industry, 1997, vol. 80, No. 7, pp. 57-59.

Yong et al., "Leak Detection Method Based on Pressure Wave Change", 6th ASME International Pipeline Conference, 2006, Calgary, Alberta, Canada.

Schedelberger et al., "Procedure for the Detection of Leaks in Fluid Pipelines With Determination of Leak Volume and Location", Oil and Hydrocarbon Spills III: Modelling, Analysis and Control, 2002, A. Brebbia, Wessex Institute of Technology, Southampton, United Kingdom.

Da Silva et al., "Leak Detection in Petroleum Pipelines Using a Fuzzy System", Journal of Petroleum Science and Engineering, 2005.

Abhulimen et al., "Modelling Complex Pipeline Network Leak Detection Systems", Process Safety and Environmental Protection, Institution of Chemical Engineers, 2007.

The International Search Report and Written Opinion of PCT/US2009/048831 dated Sep. 29, 2009.

The International Search Report and written Opinion of PCT/US2017/048166 dated Nov. 7, 2017.

* cited by examiner

METHOD AND APPARATUS FOR REAL TIME ENHANCING OF THE OPERATION OF A FLUID TRANSPORT PIPELINE

CROSS REFERENCE TO RELATED APPLICATIONS

This application is a continuation-in-part application of U.S. patent application Ser. No. 14/313,267 filed on Jun. 24, 2014 entitled "A Method and Apparatus for Real Time Enhancing of the Operation of a Fluid Transport Pipeline", which relates and claims priority to U.S. patent application Ser. No. 12/492,564, filed on Jun. 26, 2009, which relates and claims priority to U.S. Provisional Patent Application No. 61/129,466, filed on Jun. 27, 2008, entitled "A Method and Apparatus for Enhancing the Operation of a Fluid Transport Pipeline."

FIELD

The present invention relates to a method and system for enhancing the operation of a pipeline. In particular, the present invention is directed to a real time method and a dynamic, logic-based system for monitoring the operation of a pipeline network, generating alarms in response to differing levels of destabilized pipeline operations and managing the operation of the pipeline in response to the same. In particular, the present invention relates to a method and a dynamic behavior based system for the monitoring of a pipeline, and the detection and reporting of destabilized operating events including but not limited to possible pipeline rupture events based upon sensed hydraulic reactions within the pipeline network. The present invention also relates to a method and system for monitoring the generation of alarms in response to sensed destabilizing events. The present invention also relates to a system for maintaining the stable operation of the pipeline, monitoring potential destabilizing events and pinpointing the location of the same in order to enact sufficient remedial measures to avoid or prevent a catastrophic destabilized event (e.g., leak, rupture or equipment failure). The present invention also relates to a method and system for diagnosing destabilizing events.

BACKGROUND

Pipelines are used to efficiently transport fluid commodities from one location to another and, generally, span long distances. Pipelines are typically monitored and controlled to ensure the integrity of the pipeline. This is normally accomplished from a central control center where equipment settings and measured parameters are monitored and controlled. Leaks can be detected by measuring various parameters, particularly flow rate and pressure. This monitoring depends on calculating the mass of the contents of the pipe (fluid), and observing over a period of time whether the contents of the pipe changes in a manner indicative of fluid leaving the pipe at an unmeasured location, perhaps through a rupture in the pipeline. The effect of a leak on the measured parameters and thus on the calculated mass of fluid within the pipe is mathematically relatable to the mass of fluid which is leaving the pipe through the rupture. Using existing methods, large ruptures can be detected in relatively short periods of time. Small ruptures, however, if at all detectable, require longer periods of time to accumulate the necessary volumetric discrepancies to indicate excessive system measurement imbalance, which may result in a greater amount of fluid leaking from the system into the surrounding environment. These systems depend on a balancing algorithm to determine if fluid is leaving the pipeline at an un-metered location to determine if there is a rupture. As may be appreciated, these prior art systems require that a sufficient volume of fluid has left the pipeline through the rupture before detection of the rupture can occur. This can result in a significant environmental impact in the area surrounding the rupture as inferential measurement systems are commonplace and relatively lethargic with respect to hydraulic wavespeeds and the ensuing segmental decompressions that follow rupture events in closed pressurized hydraulic networks.

Calculating the mass of the contents in the pipe is subject to many inaccuracies (e.g., errors in measurement of the mass of the fluid entering and leaving the pipe, inaccurate knowledge of the changes in the physical space within the pipe due to temperature fluctuations in the pipeline walls and the minimal knowledge of the actual temperatures and pressures within the pipeline, transducer calibration and/or configuration correctness).

The approximate location of a piping rupture can be determined using existing methods for large ruptures by examining the effects of the rupture on the flow rate and pressure at locations where measurements are available. Locating the rupture under existing methods is subject to several possible inaccuracies related to measurement system and ancillary instrumentation system parameterization, configuration, and calibration. As the volume of fluid exiting through the rupture drops to a small fraction of the flow rate of the pipeline, the effect of the missing fluid will drop below the accuracy with which the parameters used to calculate the location are measured. Additionally, common inferential mass metering systems often operate within nonlinear regions of equipment operation thus degrading leak detecting capabilities.

There is a need for a system and method to rapidly detect and accurately predict the location of a destabilizing event in a pipeline network. Others have attempted to develop systems that are more effective in identifying ruptures than those described above, but these systems only identify leaks and ruptures and not destabilizing events. These destabilizing events may not be a leak or rupture, but impact the operation of the pipeline. These systems, however, compare sensed conditions with pre-identified stored leak profiles. These systems do not identify unstable operations that are not leaks or ruptures, the locations of these unstable operations or the source(s) of concern. These systems are not dynamic, as such, these systems do not adequately respond to abnormal changes in the operation of a pipeline network that are not indicative of the presence of a leak or a rupture.

U.S. Pat. No. 5,361,622 to Wall discloses a device and method for the detection of leaks in a pipeline. Wall utilizes a transducer for measuring instantaneous pipeline pressure. Wall utilizes a computer to compare rates of change of the measured pressure at successive preselected and fixed timed intervals at isolated nodes. The computer compares the measured rate of change with a preselected total change in a specified characteristic at that node. When the measured rate of change exceeds the preselected maximum total change, an alarm is triggered indicating the possibility of a leak or rupture. These maximums, however, do not vary or adjust for variations in the pipeline operation. Wall does not aid in the determining the location of the leak or rupture because its analysis is site specific. Wall provides for local or isolated analysis at select points within the pipeline. Wall does not corroborate these changes with any changes occurring at other nodes. This lack of corroboration leads to a greater potential for false alarms.

U.S. Pat. No. 5,388,445 to Walters et al discloses a method and an apparatus for detecting a wave front caused by the onset of leaks or other transient events in a pipeline. Walters seeks to detect a significant wave front traveling in the high noise environment characteristic of pipelines, and to accurately measure its amplitude and time of arrival. Walters discloses detecting a wave front indicative of a transient event occurring in a pipeline by measuring a characteristic related to pressure of a fluid in the pipeline with a measuring device positioned at a given point on the pipeline, and outputting analog signals proportional to the pressure. The detection of the wave front arrival time may be used directly to sound an alarm. The amplitude may be used to find the location and/or size of the leak. Walters, however, does not provide means for discounting (i) external influences on the pipeline, which may produce wave fronts but are not leaks or (ii) internal influences such as changes in the viscosity or strip operations within the pipeline, which again may produce wave fronts but are not leaks. The model employed in Walters is a fixed model. It does not adjust or learn based upon varying pipeline operations and external influences; rather, it relies upon a fixed reference event to determine leaks. Accordingly, the system disclosed by Walters may be prone to false leak indications. Furthermore, Walters looks at measurements obtained during affixed time window and does not account for events that may start during one window and end during another window. Accordingly, the system may fail to detect a leak nor does it attempt to identify or diagnose destabilizing events that are not leaks but that may adversely affect the pipeline network's efficiency of operation or safety.

U.S. Pat. No. 5,428,989 to Jerde et al discloses a method and an apparatus for detecting and characterizing a leak using a pressure transient. Jerde provides a plurality of pressure monitoring stations spaced along a pipeline at known distances from each other. The stations generate an arrival time signal when a pressure wave front is detected. The system can determine whether the arrival time signals from the plurality of monitoring stations correspond to the same event.

U.S. Pat. Nos. 6,389,881 and 6,668,619 both to Yang et al disclose an acoustic based method and apparatus for detecting and locating leaks in a pipeline. Yang utilizes a system for detecting leaks using the acoustic signal generated from a leak event in a pipeline. The system requires the use of non-industry standard specialized components mounted to the pipeline at selected locations. A pattern match filter is used to reduce false alarm rate and improve leak location accuracy by comparing acoustic waves generated by a leak with stored previously recorded signature leak profiles. Yang utilizes a time stamp of the acoustic signal to pinpoint the location of the leak. The system listens for acoustic waves to determine whether or not a leak is present. Normal operating events (such as pump start ups, etc.) and isolated events (such as a piece of equipment hitting the pipeline) may generate an acoustic signal that travels through the pipeline but not a pressure wave characteristic of a leak. As such, the Yang system is more prone to issuing false alarms.

U.S. Pat. No. 6,970,808 to Abhulimen et al discloses a method for detecting and locating leaks in a pipeline network in real-time utilizing a flow model that characterizes flow behavior for at least one of steady and unsteady states, which corresponding to an absence and a presence of model leaks in the pipeline network. A deterministic model is provided to evaluate at least one of a leak status and a no leak status relating to the pipeline network using deterministic criteria.

These prior art systems are not proactive systems; rather, these systems are reactive in nature relying upon comparisons to historical data or predetermined modeled results in order to determine whether or not a leak is present. These prior art systems essentially reset to the original threshold after each detection of a potential leak. The thresholds of prior art do not rescale themselves in real time to take into account normal changes in pipeline operation. The thresholds are generally high, which overlook changes due to small leaks. These prior art systems do not rely upon present pipeline activity in order to determine the presence of a leak or rupture, which may require further action nor do they perform corroborating steps to confirm a destabilized event, nor do they diagnose the source of the destabilizing event (e.g., process error, equipment malfunction). These systems do not continuously adjust detection thresholds to account for the various normal operating modes of pipeline networks. While it is desirable to maintain a stable pressure and stable flow through the pipeline network, changes in pressure and flow are common due to changes in viscosity of the various fluids flowing through the network, equipment malfunction, etc. These prior art systems are not capable of accounting for these variations in pipeline activity. As such, these prior art systems may generate a significant number of alarms indicating a potential leak. Each of these alarms requires some form of action by a pipeline operator. There is a need for a dynamic logic-based system that accurately responds to the varying operating conditions present in a pipeline network while accurately identifying destabilizing events including leaks and ruptures while minimizing false alarm events. Furthermore, there is a need for a system that effectively manages the generation of alarms.

SUMMARY

It is an aspect of the present invention to provide a method and dynamic system of monitoring a pipeline network to identify possible destabilizing events in the pipeline network. The present invention is intended for use in various pipeline networks and is not intended to be limited to those networks used for transporting oil, liquefied natural gas, gas or products derived from the same. The method and associated system are contemplated for use in pipeline networks including but not limited to networks interconnecting one or more of the following: refineries, petrochemical production facilities, pumping stations, storage facilities, distribution terminals, drilling stations, off-shore terminals and off-shore drilling platforms. It is contemplated the present invention has application in any environment where a liquid or other fluid is transported via pipeline (e.g., water distribution system, food processing facilities, etc).

The method according to an aspect of the present invention may include sensing one or more pressure waves within the pipeline network at predetermined locations within the pipeline network, and determining the presence of a possible destabilizing event in the pipeline network in response to the sensed pressure waves. The destabilizing events can vary from a leak or rupture of the pipeline to a component failure in the field (e.g., a pump or valve or other pipeline equipment related to the operation of the pipeline) to a process error, which may attributed to an operator error (e.g., set point misplacement of a control valve or variable frequency drive adjustment) or misoperation of the pipeline. The destabilized events have varying degree of severity (with a potential leak or rupture having the highest level of severity). Nonetheless, each destabilizing event requires some level of attention. If a low level destabilizing event continues without implementing remedial measures steps, the efficient operation of the pipeline may be impacted, resulting in a potential fail safe operation (e.g., insufficient fluid feed to a pipeline pump, pressure within the pipeline is too high, component failure, etc.) By implementing corrective measures to stabilize the destabilizing event, potential ruptures and leaks can be prevented, stable operation is maintained, efficient pipeline operation is returned, damage to equipment is prevented and pipeline life may be extended (through reductions in strain, fatigue and wear on the pipeline).

In accordance with an aspect of the present invention, the sensing of pressure waves within the pipeline network occurs at the highest sampling rate permitted or sample rate limit of the pressure transmitter sensor associated with the pipeline. The sampling is accomplished using existing pipeline equipment and does not require the placement of additional or customized equipment on the pipeline for purposes of event detection. The sampling is repeated in order to determine the presence of a destabilizing event in the pipeline network. Determining the presence of a possible destabilizing event in the pipeline network in response to the sensing of the pressure waves may include detecting variations in the sensed pressure waves. This may include the use of the SCADA system to determine whether rapid pressure decay and the subsequental segmental decompression characteristic of leak events on a pressurized hydraulic network occurred within the pipeline system. The method preferably includes determining whether or not the detected variation exceeds an accepted standard deviation. Unlike prior art systems, the use as applied within the present invention of the standard deviation takes into account varying modes of pipeline operation (e.g., draw mode, where pipeline fluid is pushed from one end to the other but is also withdrawn at intermediate points, and tight line mode, where no pipeline fluid is withdrawn at intermediate points, etc.). The prior art systems rely upon a fixed threshold. When the threshold is exceeded, an alarm is triggered. According to an aspect of the present invention, the threshold utilized changes to account for changes in the operating conditions due to changes in operating mode, changes in operation due to normal noise, temperature, different types of fluids (e.g., gasoline or diesel fuels) and location of the pipeline (e.g., above ground, below ground, underwater). The threshold may be increased or decreased in response to known operating conditions or events. For example, the threshold may be increased in response to the startup or shutdown of a pump or other pipeline equipment. Increasing the threshold prevents the identification of an operationally acceptable destabilizing event that may be solely attributable to the component startup. When a pump shuts down, and steadystate is reattained, the threshold may be decreased or retuned from transient noise to steadystate normal noise thereby more tightly monitoring the system for operationally unacceptable destabilizing events. This would allow the detection of destabilizing events that may not have been identified if the threshold was maintained constant. Using the standard deviation, the reported high speed pressure decay can be analyzed to determine if it originated from known pipeline operational activities or is attributable to a potential leak or other destabilizing event. The presence of a high speed pressure decay is indicative of a leak or rupture. In the event that the pipeline is submerged underwater, there may be an increase in pressure as opposed to a pressure decay due to the pressure exerted on the pipeline from the water entering the pipeline. A comparison of the time of reported pressure reactions with the times of recent pipeline operational activities is made to determine if given the time differential and linear pipeline distance between the activity and the detection of the pressure response was caused by the normal pipeline activity by comparing time, speed, and distance calculations against known pipeline parameters and fluid wave propagating characteristics. The sensed pressure pulse for a destabilizing event moves faster through the pipeline than the normal flow profile of the fluid within the network.

In accordance with another aspect of the present invention, the method of monitoring the pipeline network may further comprise determining the location of the possible destabilizing event in the pipeline network in response to the sensed pressure waves. The presence and location of the possible destabilizing event may be reported to one or more operators of the pipeline network. In the event the destabilizing event is of a high level, the operator takes appropriate remedial measures (e.g., pump shutdown, setpoint adjustment, valve operation, system shutdown) to minimize the loss of fluid from the system and minimize the impact to the surrounding environment. Determining the location of a possible destabilizing event in the pipeline network in response to the sensed pressure waves may include identifying which predetermined locations a destabilizing event (e.g., a rupture) indicating pressure reaction is sensed at a first sensing time, then identifying which predetermined locations the sensed pressure wave is sensed at a second sensing time, and determining the location of a possible destabilizing event based upon the location of the sensed pressure wave at the first sensing time and the second sensing time. The plurality of coincidentally timed pressure reactions are analyzed to determine a probable location of the incident which caused the pressure reaction. The sensed reactions' chronology is compared for reasonableness against known parameters of the subject pipeline system and the fluid or fluid set within the pipeline.

In accordance with another aspect of the present invention, the method of monitoring a pipeline network may further include determining the certainty of the possible destabilizing event and reporting the presence, location and certainty of the possible destabilizing event to one or more operators of the pipeline network. The certainty of the possible destabilizing event may include comparing the determination of a possible destabilizing event based upon sensed pressure waves with one or more current sensed pipeline network operating conditions.

It is another aspect of the present invention to provide a system for monitoring a pipeline network for detecting destabilizing events in the same. The pipeline network may include a first facility, a second facility, at least one pipeline segment connecting the first facility and the second facility such that the fluid can flow between the first facility and the second facility, and at least one pumping station (which may include a pump set) connected to the at least one pipeline segment. Various facilities are contemplated to be within the scope of the present invention including but not limited to refineries, petrochemical production facilities, pumping stations, storage facilities, distribution terminals, drilling stations, and off-shore drilling platforms. For example, the pipeline may extend from a refinery to a distribution terminal, an off-shore drilling platform or terminal to on-shore storage or processing facilities or refinery. The network is not limited to two facilities. Various combinations and numbers of facilities and pipeline segments are considered to be within the scope of the present invention. Each pumping station preferably includes at least one pump. The pumping stations may include a centrifugal type pump or pump set for withdrawing fluid at the desired pressure and rate from the upstream pipeline segment and pushing the fluid into the downstream pipeline segment at the desired pressure and rate. The monitoring system includes a plurality of pressure sensing devices for sensing the presence of one or more pressure waves within the pipeline network. Each pressure sensor device is preferably an existing pressure transmitter associated with the pipeline. The plurality of pressure sensing devices preferably includes a pair of pressure sensing devices for each pumping station. A first sensing device of the pair of pressure sensing devices is located on one side of the pump or pump set and a second sensing device of the pair of pressure sensing devices is located on an opposite side of the pump or pump set. Each pressure sensing device is capable of sensing one or more pressure waves within the pipeline network. The monitoring system further includes a plurality of remote monitoring devices operatively connected to the first facility, the second facility and at least one pumping station. The remote monitoring devices monitor the operation of the pipeline network and collect operating data of the pipeline network from the sensing devices and other monitoring devices. Each of the plurality of pressure sensing devices is operatively connected to at least one remote monitoring device. The monitoring system further includes a control unit operatively connected to the plurality of remote monitoring devices for controlling the operation of the pipeline network based upon signals received from the plurality of remote monitoring devices. The control unit detects the presence of possible destabilizing events in the pipeline network and determines the location of possible destabilizing events in the pipeline network based upon the sensed pressure waves. This application is performed by a high speed time-synchronized array of pressure sensing field located instruments and processors.

The control unit includes a real time optimizer. The real time optimizer determines the presence of a destabilizing event in the pipeline network based upon the sensed pressure waves. Furthermore, the real time optimizer determines whether or not variations in the sensed pressure waves are present and whether or not each variation or variation set exceeds an accepted standard deviation (with respect to empirically determined normal pipeline system behavior for the current mode) or other statistical comparator (e.g., positive or negative rate of change of decompression in the network). The real time optimizer may further corroborate and determine the certainty of the possible destabilizing event by comparing the determination of a possible destabilizing event based upon sensed pressure waves with one or more sensed pipeline network operating conditions sensed by the plurality of remote monitoring devices. The real time optimizer determines the location of the destabilizing event in the pipeline network based upon the location of the pressure sensing devices that sensed a pressure wave of a particular reaction and the actual real-time pipeline system hydraulic character with respect to the empirically determined acceptable hydraulic profile.

The control unit may identify remedial measures to address the destabilizing event including but not limited to the modification of operating parameters, the resetting of equipment, notifying the human pipeline controller, and/or the maintenance review of equipment in response to the determination that a destabilization event exists. In the event that a rupture or leak is detected the control unit may identify or automatically execute remedial measures to minimize fluid loss from the system. The remedial measures may include but are not limited to the powering off of pumps to reduce flow to the leak, temporarily shutting down the pipeline, diverting the flow within the pipeline, and isolating the leak site.

It is another aspect of the present invention to provide a system that effectively provides for alarm management to reduce the number of the false alarms. During normal operation of the pipeline network, various steady-state and transient pressure profiles are generated that are not attributable to a destabilizing event, but nonetheless create pressure activity that generates an alarm signal. These can be attributed to normal pipeline operation and can be indicative of changes in operating mode and/or changes in operating events. For example, changing the operating mode from tight line mode to draw mode may create a pressure wave within the network giving rise to an alarm. Similarly, the normal operation of pumping units within the network (i.e., turning pumps on, off or adjusting a variable frequency drive) may create a pressure wave within the network giving rise to an alarm. These pressure waves reflect normal pipeline operation but may give rise to hundreds of false alarms on a daily basis. The dynamic nature of the system in accordance with the present invention provides effective alarm management to reduce the overall occurrence of the false alarms. This reduction in false alarms provides the pipeline operator with more time to address and respond to actual alarms as well as heighten the operator's sensitivity to actual alarms.

In accordance with another aspect of the present invention, a method and system for managing the generation of alarms for possible destabilizing events in a pipeline network is provided. The system preferably performs the method described herein. The method includes sensing one or more pressure waves within the pipeline network at predetermined locations within the pipeline network, automatically adjusting a predetermined stable operating threshold for the pipeline network at the predetermined locations based upon at least one of the operating mode of the pipeline network, current operating conditions in the pipeline network and current operating events in the pipeline network, and determining the presence of a possible destabilizing event in the pipeline network by determining whether or not the sensed pressure waves exceed the adjusted predetermined stable operating threshold. In response to the determination, the method further includes generating an alarm indicating the possible presence of a destabilizing event when the sensed pressure waves exceed the adjusted predetermined stable operating threshold. The determination of the presence of a possible destabilizing event in the pipeline network in response to the sensed pressure waves may further include detecting variations in the sensed pressure waves, and determining whether or not the detected variation exceeds an accepted standard deviation. The accepted standard deviation may be an empirically determined standard deviation. The method may further include determining whether or not a subsequential decompression characteristic is present following the detection of a variation in sensed pressure waves. When the characteristic is present, an alarm is generated indicating the presence of a leak.

It is another aspect of the present invention to provide a monitoring system for detecting destabilizing events in a pipeline network and diagnosing the destabilizing events to identify (i) the location of the same and (ii) identify potential causes and remedial and/or corrective measures for the same. The system is especially useful in diagnosing both high level and lower level destabilizing events such that corrective measures can be implemented to minimize any long term detrimental impact on the pipeline network and to promptly return the network to stable operation.

In accordance with another aspect of the present invention, a pipeline monitoring system is provided that diagnoses the potential source of destabilizing events. The system includes a control unit that diagnoses a potential cause of the sensed destabilizing event by comparing the character of the sensed destabilizing event using an expert based diagnostic subroutine with at least one of prior destabilizing events, the current operating mode of the pipeline network, the current operating conditions in the pipeline network and the current operating events in the pipeline network. The control unit may identify remedial measures to isolate or correct the possible destabilizing event in response to the determination that a possible destabilizing event exists. The control unit may then report the remedial measures to an operator of the pipeline network. It is also contemplated that the control unit may automatically execute the remedial measures.

BRIEF DESCRIPTION OF THE DRAWINGS

The foregoing and other advantages of the present technique may become apparent upon reading the following detailed description and upon reference to the drawings wherein like reference numerals describe like elements and wherein.

DETAILED DESCRIPTION

In the following detailed description and examples, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The present invention is directed to a system and method for detecting the occurrence of destabilizing events in one or more pipeline networks. The terminology "destabilizing event(s)" is intended to encompass any event or activity including but not limited to leaks, ruptures, equipment failures, equipment malfunction, process errors, etc that may have an adverse impact on the stable operation of the pipeline network. In particular, a real-time optimizer (RTO) is utilized with a Supervisory Control and Data Acquisition (SCADA) unit to detect destabilizing events in the pipeline by detecting pressure reactions within the pipeline, comparing these reactions with empirically determined acceptability for the current pipeline mode, eliminating those reactions caused by known pipeline events, using a method of sonar distancing to determine where the pressure reactions originated, and evaluating other real-time operational data to corroborate the occurrence of a rupture. The RTO is an expert algorithm based control system designed to optimize the safety and minimize the environmental impact of the pipeline due to destabilizing events while effectively managing the generation of alarm events. To enhance the detection of destabilizing events in pipelines, the RTO analyzes concurrent or real-time operational data from the SCADA unit. From the analysis, if a possible destabilizing event is detected, an alarm is generated via the SCADA unit to alert the operator of the pipeline network. The information used to assess the possibility of a rupture may be provided to the operator either graphically, audibly or textually or any combination thereof. It is contemplated that the system can recommend or automatically execute corrective measures to minimize the impact of destabilizing events on the pipeline system and return the pipeline network to stable operation.

Figure 1:
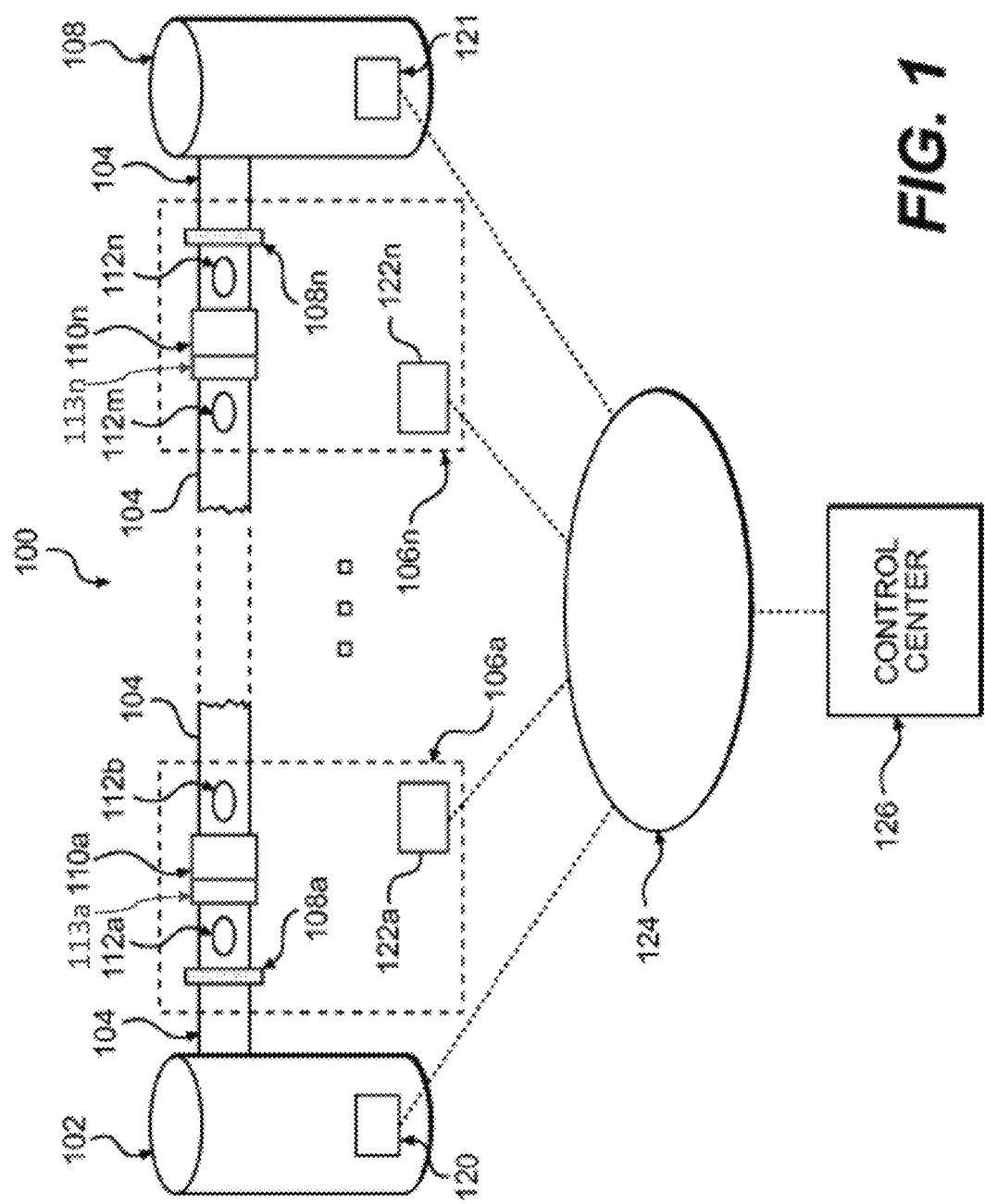
FIG. 1 is an exemplary pipeline network in accordance with certain aspects of the present techniques.

Turning now to the drawings, and referring initially to FIG. 1, a pipeline network 100 in accordance with some aspects of the present techniques is illustrated. In the pipeline network 100, a fluid, such as one or more fluid commodities (e.g., oil, gas and products produced therefrom), is transported from a first facility 102 through various pipeline segments 104 and pump stations 106a-106n to at least a second facility 108. The first facility 102 and second facility 108 may be any facility associated with the production, processing and transporting of oil, gas and/or products derived therefrom including but not limited to an oilfield production tree, surface facility, distribution facilities, oil sands plant or the like, an off-shore drilling platform, an off-shore distribution or transportation terminal, refineries, petrochemical facilities, etc. The pipeline segments 104 may include tubular members to transport of fluid commodities therethrough. It should be noted that n may be any integer number and that this embodiment is merely for exemplary purposes. For instance, other embodiments may include single or multiple product strip or injection points, branches in the pipeline, as well as any number of intermediate pump stations. The present invention is intended for use in various types of pipeline networks having one or more branches.

Figure 3:
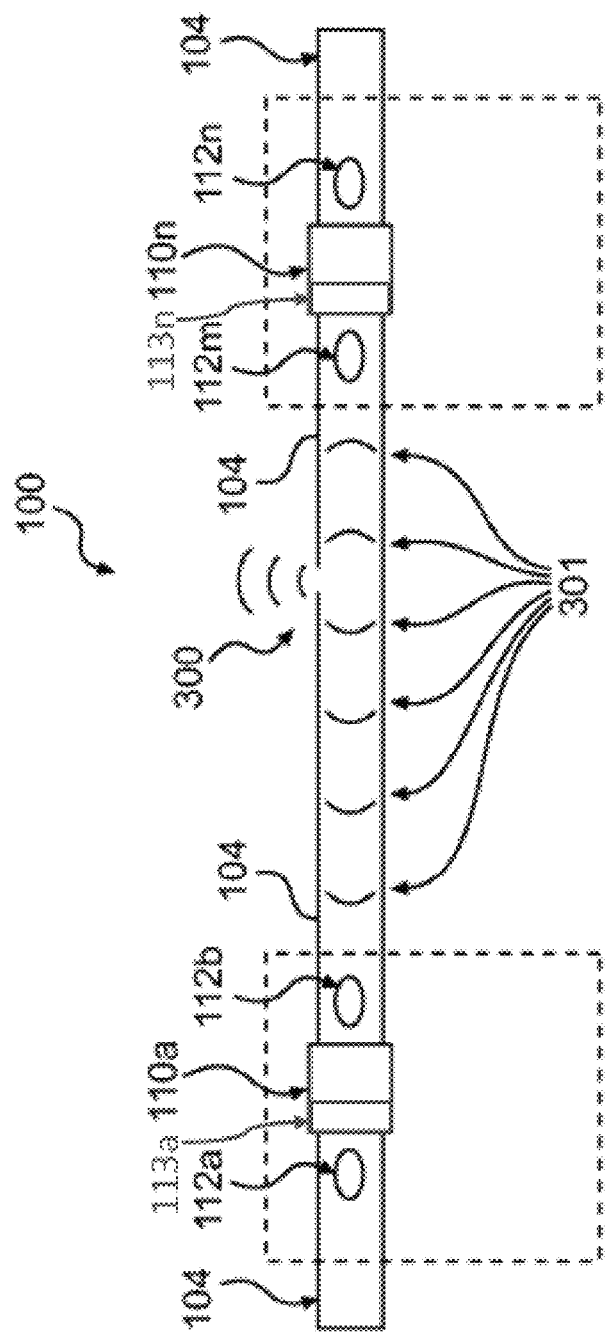
FIG. 3 is an exemplary embodiment of a pressure wave caused by a rupture in the pipeline network of FIG. 1.

The pump stations 106a-106n includes one or more pumps 110a-110n, one or more sensors 112a-112n, and/or one or more meters 108a-108n. The pumps 110a-110n may include one or more synchronous electrical motor pumps, variable frequency drive (VFD) pumps and/or the like. Electrically controlled pump drivers 113a-113n such as motors, engines, turbines, etc. may be coupled to pumps 110a-110n. The pressure sensors 112a-112n are preferably located both upstream of the first pump 110a-110n and downstream of the last pump 110a-110n in each pump station 106a-106n, as shown in FIG. 1 and FIG. 3. The meters 108a-108n are typically located only where the fluid commodities enter or leave the pipeline network 100, as shown in FIG. 1.

To manage and monitor the operation of the pipeline network 100, various processor based devices, such as remote monitoring devices 120, 121 and 122a-122n, are utilized to collect and communicate data about operational settings, which include equipment settings (e.g., equipment status, etc.) and measured parameters (e.g., pressure, temperature, flow rate, etc.) of the pipeline network 100. The remote devices 120, 121 and 122a-122n may be programmable logic controllers (PLCs), loop controllers, flow computers, remote terminal units (RTUs), human machine interfaces (HMIs), servers, databases and/or a combination of these types of processor based systems. These remote devices 120, 121 and 122a-122n may also include monitors, keyboards, pointing devices and other user interfaces for interacting with an operator.

Each of the remote devices 120, 121 and 122a-122n may be located in one or more of the first facility 102, pump stations 106a-106n, and second facility 108 to collect data from the sensors 112 the operational data, such as operational settings or telemetry data, from the equipment and/or meters 108a-108n associated with the pipeline network 100. The control signals from the equipment (e.g., pumps 110a-110n and/or meters 108a-108n) and sensors 112a-112n may be limited by the distance that the control signals may be transmitted by a switch or transducer that is part of the equipment or meter 108a-108n. As such, each of the remote devices 120, 121 and 122a-122n may operate as a central collection location for the data from one specific pump station 106a-106n or other pipeline facility. As an example, the operational settings may include data about the draw rate, pump status, drag reducer additive (DRA) injector status, valve status, DRA injection rate, variable frequency drive settings, flow rate in the pipeline segments 104, height of fluid within tanks in the facilities 102 and 108, fluid temperature; pressure in the pipeline segments 104, density of the fluid commodity, and/or batch interface. The remote devices 120, 121 and 122a-122n receive, process and store the various control signals in local memory. In this manner, the operational settings for each location may be efficiently managed for further distribution to the control center 126.

The remote devices 120, 121 and 122a-122n interact with other devices that may be located at one or more control centers 126 via the network 124 to further process the operational data. The control centers 126 may include one or more facilities, which house various processor based devices having applications utilized to manage the equipment and to monitor sensors 112a-112n or meters 108a-108n distributed along the pipeline network 100. A control center 126 is shown in greater detail below in FIG. 2. Because each of the remote devices 120, 121 and 122a-122n and the control centers 126 may be located in different geographic locations, such as different structures, cities, or countries, a network 124 provides communication paths between the remote devices 120, 121 and 122a-122n and the control centers 126. The network 124 may comprise different network devices (not shown), such as routers, switches, bridges, for example, may include one or more local area networks, wide area networks, server area networks, or metropolitan area networks, or combination of these different types of networks. The connectivity and use of the network 124 by the remote devices 120, 121 and 122a-122n and the devices within the control centers 126 is understood by those skilled in the art.

Figure 2:
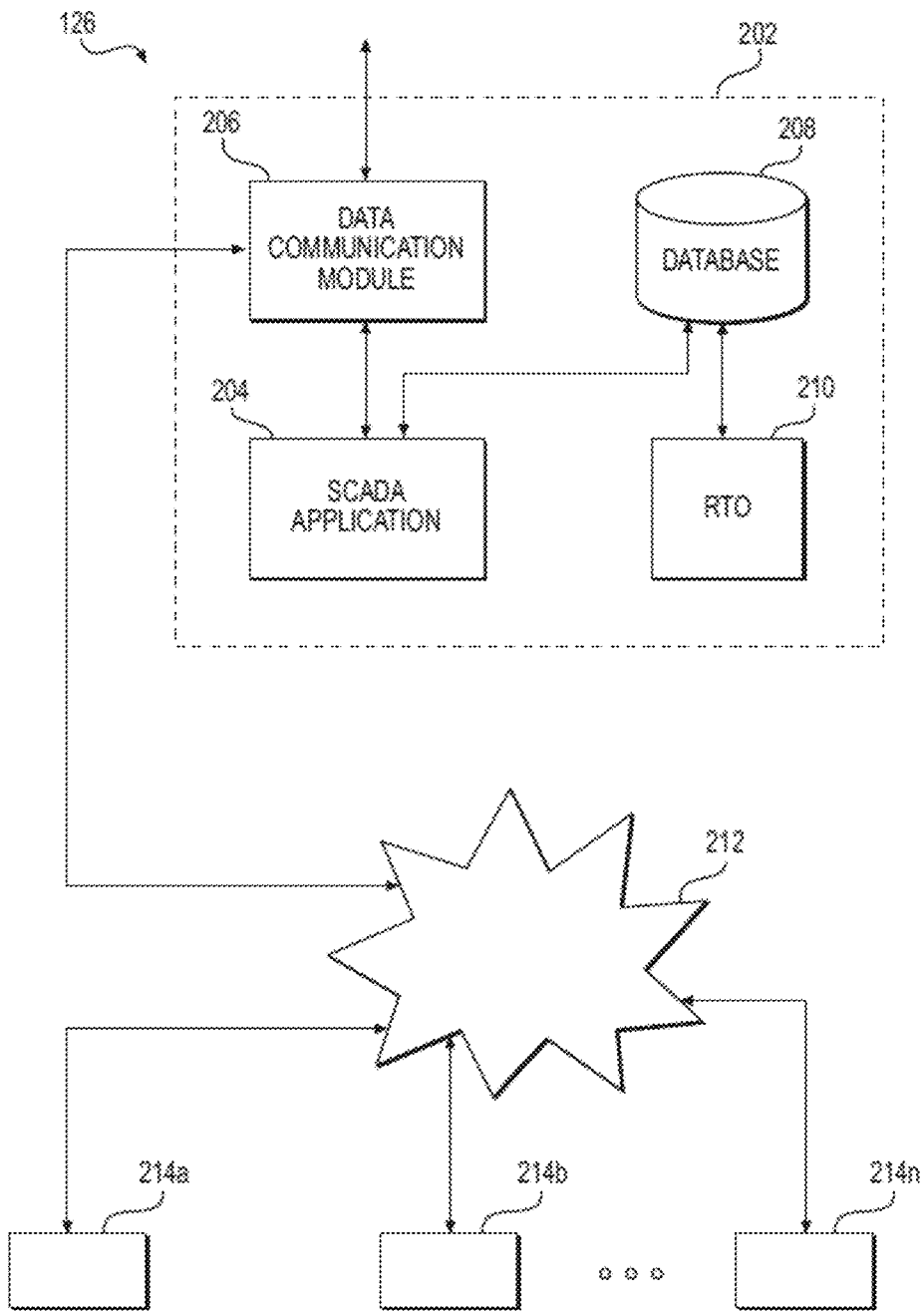
FIG. 2 is an exemplary embodiment of the control center of FIG. 1 in accordance with aspects of the present techniques.

A control center 126 in accordance with aspects of the present invention is illustrated in FIG. 2. The control center 126 is utilized to monitor and control the equipment and sensors 112a-112n in the pipeline network 100. As a specific example of the operation performed by the control center 126, pseudo code is listed below in Appendix A. The control center 126 includes a supervisory control and data acquisition (SCADA) unit 202 coupled to various control devices 214a-214n via a network 212. The SCADA unit 202 provides a pipeline operator with access to operate the equipment in the pipeline network 100. While a single SCADA unit 202 is illustrated, it should be appreciated that the control center 126 may include one or more local or regional SCADA units and one or more master SCADA units to manage the local SCADA units in other control center architectures.

The SCADA unit 202 contains one or more modules or components that perform specific functions for managing the transport of the fluid commodities. For instance, the SCADA unit 202 may include a SCADA application 204 that includes one or more software programs, routines, sets of instructions and/or code to manage the operation of the pipeline network 100. The SCADA application 204 may include OASyS DNA by TELVENT; Ranger by ABB, Inc.; Intellution by GE, Inc.; and/or UCOS by Control Systems International (CSI), Inc. The SCADA unit 202 includes a data communication module 206 and a database 208. The data communication module 206 includes a set of instructions that manage communications with other devices (e.g., request the operational settings from the remote devices 120, 121 and 122a-122n at specific intervals or provide equipment settings to the devices 120, 121 and 122a-122n). The database 208 may be of any conventional type of computer readable storage device used for storing data, which may include hard disk drives, floppy disks, CD-ROMs and other optical media, magnetic tape, and the like, which stores the operational settings. The SCADA application 204 analyzes the operational settings, which may include converting the operational settings into a specific format for presentation to operators and/or identifying alarm conditions. The results of this analysis, along with the operational settings, are then stored in the database 208, as operational settings and operational reports. Then, the operational settings and operational reports may be synchronized to other databases of additional SCADA units in other locations.

In addition, the operational settings and operational reports may be presented to processor based devices, such as control devices 214a-214n, via the network 212 to provide an operator with data about the real-time operation of the pipeline network 100. The control devices 214a-214n may be computers, servers, databases and/or a combination of these types of processor based systems, which may also include display units (e.g. monitors or other visual displays), keyboards, pointing devices and other user interfaces for interacting with the operator. The network 212, which may include similar components to the network 124, may be utilized to provide communication paths between the control devices 214a-214n and the data communication module 206 in the SCADA unit 202. Typically, the network 212, which may include different networking devices (not shown), may include one or more local area networks or server area networks, but may also include wide area networks, metropolitan area networks, or combination of these different types of networks for certain operations. The connectivity and use of the network 212 by the control devices 214a-214n and the SCADA unit 202 is understood by those skilled in the art.

To operate the pipeline network 100, the operator enters operational instructions into one of the control devices 214a-214n. These operational instructions, which may include equipment settings or flow rates or operating modes (i.e., tight line mode or draw mode), for example, are communicated to the SCADA application 204 through the data communication module 206 in the SCADA unit 202. The SCADA unit 202 stores the operational instructions in the database 208 and may synchronize the operational instructions with other SCADA units. The SCADA application 204 analyzes the operational instructions and converts the operational instructions into equipment settings, which may be in the same or a different format that is accepted by the remote devices 120, 121 and 122a-122n. The SCADA application 204 converts the operational instructions from units of measurement for the operator into units of measurement for the remote devices 120, 121 and 122a-122n. The equipment settings are then transmitted to the remote devices 120, 121 and 122a-122n by the data communication module 206. Once received, the remote devices 120, 121 and 122a-122n acknowledge the equipment settings and transmit the equipment settings by providing the appropriate control signal to the equipment. The equipment settings (e.g. opening or closing flow control devices, starting or stopping pumps, and/or starting or stopping DRA injectors to adjust the rate DRA is being injected into the pipeline segments 104) are then executed by the respective equipment.

For the pipeline network 100 to operate efficiently, and carry a large volume of fluid from one facility 102 to another facility 108 the pumps 110a-110n are used to raise the pressure in the pipeline to pressure levels much greater than that of the atmosphere surrounding the pipeline segments 104 and pump stations 106a-106n. This pressure differential places stresses on the various elements of the pipeline network 100 used to contain the fluid being transported. As a consequence of these pressures, it is possible that the elements containing the pressure differential, and in particular compromised areas (corrosion) or lower rated pipeline elements, may rupture, as shown in FIG. 3, below. It is also possible that the pipeline equipment contained in the pumping stations and elsewhere may fail or operate improperly, which can create unstable operating conditions that may lead to a possible rupture. Furthermore, unstable operation could result from improper operational instructions entered into by one of the control devices 214 by the pipeline operator or the failure of the operator to adjust the necessary operational instructions in response to a change in operating mode or a change in the fluid within the pipeline.

When an element of the pipeline network 100 ruptures 300, the pressure at the rupture location rapidly changes, as the first molecules of fluid are pushed from the pipeline by the pressure differential. This pressure change causes pressure in the fluid adjacent to the rupture to change in response to the initial pressure change. This effect is carried through the pipeline network 100 as a pressure, shock or sound wave 301. The pressure wave 301 travels through the fluid at a speed relative to the sonic characteristics of the fluid or chain of batched fluids (gaseous or liquid) along the pipeline's length, so that the time the pressure wave 301 travels is mathematically relatable to the distance it has traveled. The operation of a pump 110 or other pipeline component may create a pressure or sound wave, which travels through the pipeline in a similar manner. The unstable operation of the pipeline may also create a pressure or sound wave within the pipeline. Such a wave may not be as high as those associated with a rupture.

Many of the prior art systems, some described above, designed to detect ruptures in the pipeline network typically do not use detection of a pressure wave in their analysis. These systems depend on a balancing algorithm to determine if fluid is leaving the pipeline at an un-metered location to determine if there is a rupture. As may be appreciated, these prior art systems require that a sufficient volume of fluid has left the pipe through the rupture before detection of the rupture can occur. This can result in a significant environmental impact in the area surrounding the rupture as inferential measurement systems are commonplace and relatively lethargic with respect to hydraulic wavespeeds and the ensuing segmental decompressions that follow rupture events in closed pressurized hydraulic networks. The systems that do sense acoustic waves described above only isolate ruptures and not other destabilizing events that impact the stable operation of the pipeline network.

To provide near real-time detection of a destabilizing event including a rupture 300, and thus allow more rapid and effective action, a real-time optimizer (RTO) 210 is utilized for analyzing operational settings within a SCADA unit 202. This enhances the operation of the pipeline network 100 in real-time to respond more effectively to destabilizing events.

The RTO 210 may be implemented as one or more software programs, routines, software packages, and/or computer readable instructions that interact with the SCADA unit 202, or specifically the SCADA application 204 and database 208. The RTO 210 may also be written in any suitable computer programming language. Through the RTO 210, additional functionality may be provided to the operator to provide reports and other notifications (whether visual or audible) of suspected pipeline destabilizing events including ruptures 300 through the detection and analysis of pressure waves 301. These notifications will allow the operator to respond to high level destabilizing events and lower level events that, if left ignored, could ultimately result in a high level destabilizing event including a rupture.

To obtain information regarding pressure waves for analysis, the RTO 210 requires the collection of additional information, which may be collected and processed by remote devices 120, 121, and 122a-122n. Unlike prior art systems with predetermined sampling at fixed intervals, the sampling for pressure waves occurs at the highest rate permitted by the pressure transmitter sensors 112. This significantly reduces the likelihood of a pressure wave going undetected. The electrical representation of the pressure reported by the pressure sensors 112a-112n to the remote devices 120, 121, and 122a-122n is typically measured and processed by the remote devices 120, 121, and 122a-122n at a high rate of speed (for example, every 50 milliseconds). This differs from existing pipelines, where previous values are typically discarded and values are transmitted to the control center 126 much less frequently, for example every ten seconds. As a result, the implementation of the system according to the present invention may require modification of the remote devices 120, 121, and 122a-122n to perform statistical calculations on the pressure values. Specifically, a standard deviation may be calculated for the pressure values collected during a short period of time (for example, 15 seconds). In accordance with the present invention, the calculated standard deviation is of a rolling nature. For example, the standard deviation is calculated using pressure values collected between times t1 and t5. The next standard deviation is calculated using pressure values collected between times t2 and t6. The next standard deviation is calculated using pressure values collected between times t3 and t7. All subsequent deviations are calculated in this rolling manner. By contrast, the prior art systems review their obtained acoustic information in fixed intervals (e.g., t1 to t5, t6-t10, t11-t15). With such a review, destabilizing events that start in one period and end in another period can be overlooked. The rolling calculation of the standard deviation in accordance with the present invention avoids this occurrence. The present invention is not intended to limited to the use of an empirically computed standard deviation; rather, numerous empirically based determinations (which are not based on force fit models) including but not limited to derivative function ($1^{st}$, $2^{nd}$ and $3^{rd}$ derivatives), integral functions are well within the scope of the present invention.

An operational setting is established, such that the field devices 120, 121, and 122a-122n have available for their analysis a number representing a multiplier to be applied to the calculated standard deviation. Should the pressure sensors 112a-112n then report a pressure which exceeds the standard deviation calculated with the multiplier applied, the remote device 120, 121, and 122a-122n will declare the detection of a pressure wave 301. The normal hydraulic noise within pipeline systems produce a particular standard deviation character for the pipelines typical modes of operation while a destabilizing events such as loss of pipeline integrity (rupture) will produce a uniquely different standard deviation character than the family of normal mode standard deviation characters. Similarly, the start-up or shutdown of a pump or an unstable operation of the pipeline will produce a uniquely different standard deviation character than the family of normal mode standard deviation characters.

In order to correlate pressure waves 301 between different pressure sensors 112a-112n, it is important to have an accurate measurement of time which is synchronized between all the remote devices 120, 121, and 122a-122n on the pipeline network 100. This is accomplished by providing a receiver and appropriate additional electronics within the remote device 120, 121, and 122a-122n to allow highly accurate time synchronizing updates to be collected from the transmissions of satellites used for Global Positioning Systems and provided to the logic unit of the remote device 120, 121, and 122a-122n.

As noted above, pressure waves 301 may be caused in the pipeline network 100 through other means which are considered part of normal pipeline operations, including but not limited to the starting and stopping of pumps 110a-110n and the opening and closing of valves. It is important that the pressure waves 301 caused by these events to be taken into consideration by adjusting the alarm triggering thresholds in real time or removing it from those being considered for rupture detection. This may be done at the remote device 120, 121, and 122a-122n for those events that are initiated by the same remote device 120, 121, and 122a-122n that detected the pressure wave. Logic may be added to the remote device 120, 121, and 122a-122n to disable pressure wave detection for a certain period of time following an adjustment to an equipment setting that would result in a pressure wave. Alternatively, the triggering thresholds for a destabilizing event can be adjusted (i.e., raised or lowered) in response to the normal operating events such that destabilizing events may still be detected while accounting for the normal operating conditions. Superior possible methods include characterizing normal pipeline operating events under high speed trend analysis and build a comparative matrix of normal pipeline action characters and by reviewing these hydraulic signatures with empirically determined standard deviation thresholds providing an enhanced discrimination of destabilizing events from normal pipeline operating events and noise. This will provide an effective tool for managing the generation of alarms (i.e., false alarms) by the system, As mentioned above, during normal operation of the pipeline network, various pressure waves are generated that are not attributable to a destabilizing event, but nonetheless create pressure activity that could generate an alarm signal. The control center 126 and remote devices 120, 121, 122 can factor in pressure waves attributed to normal pipeline operation. These waves can be discounted with the necessary adjustment to the alarm triggering thresholds to reduce the number of false alarms generated. Current monitoring systems generate thousands of alarms in a given day of pipeline operation. Many of these alarms are false, which result in operators either clearing or ignoring low level alarms. This not only reduces the amount of time an operator spends addressing each alarm, but also desensitizes the operator to respond to low level alarms. The discounting of pressure waves associated with known pipeline operations, their acceptable reactions, and the adjustment of the triggering thresholds thereto can be effectively reduced by at least 60% and more preferably by at least 80%. This represents a significant reduction in the generation of hydraulic alarms, which provides the operator with more time to respond to actual alarms and also respond to low level alarms indicating unstable operation before the unstable operation leads to higher level alarms and potential damage to the pipeline.

In order to provide the information regarding the detection of pressure waves to the RTO 210, the remote devices 120, 121, and 122a-122n interact with Data Communication Module 206, the SCADA Application 204 and into the database 208. From there the RTO 210 retrieves the data as needed by its algorithms.

Once a pressure wave report has been received, the RTO 210 waits a predetermined period of time for the particular instance of the pipeline network 100 for other pressure wave reports to be made available. The pressure wave from a destabilizing event may cause more than one pressure wave report, and having two or more reports is necessary to determine the location of the destabilizing event(s). The time period to wait is determined by dividing the length of the pipeline by the speed of sound in the fluid contained in the pipeline.

Pressure waves caused by normal operation of pipeline equipment are to be ignored by the RTO 210. These pressure waves are considered "Usual Suspects", whether by reviewing the Usual Suspects' hydraulic character for normalcy or by momentarily masking normal pipeline equipment actions from RTO 210. To do this, the RTO 210 maintains a table listing the various normal, operational pipeline activities that cause a pressure waves 301 and stores within that table the time it would take a pressure wave 301 caused by that activity to reach each of the pressure sensors 112a-112m on the pipeline network 100. The RTO 210 must compare each of the pressure waves 301 reported by the pressure sensors 112a-112n with recent activity on the pipeline, removing them from consideration for destabilization event detection if the time of receipt indicates that they originated during a pipeline activity. Specific examples of the operation of the RTO 210 to identify and update Usual Suspects are illustrated as pseudo code under "Update Usual Suspects" and "Is a Usual Suspect" in Appendix A. The prior art systems compare the sensed wave to stored leak profiles. These systems, however, have limited capabilities because each leak may have a unique profile. As such each leak may not be identified. Unlike the prior art systems, the present invention compares pressure waves to normal operating conditions or normal operating events not predetermined leak profiles. As such, the present invention can more accurately detect an abnormal operating condition with greater accuracy.

Having assembled a list of pressure waves 301 that occurred during the period it would take such a wave to transit the pipeline, the RTO 210 must attempt to identify a bracketing pair of wave detections. That is, two wave detections from different pump stations 106a-106n, one on either side of the rupture 300. The rupture will be located between these two stations. This may be done by arranging the detections in chronological order, and then selecting the first two from unique stations 106a-106n while accounting for any sonic wavespeed character differences of fluids either side of the event on batched networks. The determination of whether this pair of detections is bracketing may then be determined using the following equation:

If $(t_2-t_1) \leq t_{21}$

Then the pair is a bracketing pair
Where $t_2$=time of the second detection
$t_1$=time of the first detection; and
$t_{21}$=time for a wave to travel from the station of the second detection to the station of the first detection.
That is, if the time differential is not great enough for the wave 301 to travel from one station 106a-106n to the other, then the origination of the wave 300 must be between the stations. Should the chosen pair not prove to be a bracketing pair, then each additional pair must be examined in turn to attempt to identify a bracketing pair.

The identification of a bracketing pair of wave detections provides a method to determine the location of the origin of the wave 300 (or suspected rupture). The following formula may be employed to make this determination:

$$d_2 = 0.5 * [d_{12} + (t_2-t_1) * ws]$$

where $d_2$=distance from pump station 106a-106n where second detection occurred towards pump station 106a-106n where first detection occurred.
$t_2$=time of second detection
$t_1$=time of first detection
$d_{12}$=distance from pump station where second detection occurred and pump station where first detection occurred.
ws=wave speed (speed of sound in fluid)

The detection of a pressure wave 301 not due to operational activity by two stations which are not bracketing cannot be used to determine the origin of the pressure wave 301, however, it still provides more location information than a single pressure wave detection. In this case, the RTO 210 can determine which side of a station 106a-106n the pressure wave 301 originated, by comparing the two times the pressure wave 301 was received. This can be accomplished in the following manner. If the pressure wave 301 is detected by a sensor located on a first side of the station 106 before it is detected on a corresponding sensor on an adjacent second side of the station 106, then the origin of the pressure wave is on the first side of the station 106. If the pressure wave 301 is detected by a sensor located on the second side of the station 106 before it is detected on the corresponding sensor on the first side of the station 106, then the origin of the pressure wave is on the second side of the station 106.

The RTO 210 also provides analysis on the trend of the pressures to corroborate the results of the pressure wave detection. One method to corroborate a destabilizing event leak along with the initial event signature detection is to compare the slope of the subject segment's nodal pressures from before the pressure wave 301 with the slope of the same nodal pressures from after the pressure wave 301. The slope of the pressure is calculated by the RTO 210 by storing a number of values of the pressure from predetermined and meaningfully brief time intervals. The slope is then determined by the following equation:

$$\text{Slope} = (\text{latest pressure value} - \text{oldest pressure value}) / (\text{current time} - \text{oldest time})$$

The slope prior to the pressure wave 301 is compared with the slope after the pressure wave 301. If the slope has decreased by a value greater than that of a pre-configured parameter, the trend of the pressure has changed as a result of the pressure wave 301, and this information corroborates the possibility of a rupture 300 or other destabilizing event. Other mathematical or statistical approaches are usable (such as rate of change, sum of deltas, or combinations thereof).

The RTO 210, if metering is available, may also provide analysis on the trend of the net flow of fluid through the pipeline network 100 to corroborate the results of the pressure wave detection. The trend is determined by obtaining the measured flow rates from the meters 108a-108n at all entries and exits to the pipeline network 100 and summing them (in flow positive, out flow negative). A specific example of the operation performed by the RTO 210 is illustrated as pseudo code as "store line flow data" under "RTO Event Detection" in Appendix A. The results of this summation are then compared for before the pressure wave 301 and after the pressure wave 301. If the summation has increased by a value greater than that of a pre-configured parameter, the trend of the net flow has changed as a result of the pressure wave 301, and this information corroborates the possibility of a rupture 300 or other destabilizing event.

If the SCADA Application 204 is providing a line balance function, which is a traditional method of leak detection, done by comparing volume entering and leaving the pipeline network 100 with the volume in the pipeline network 100 then the RTO 210 can perform yet another corroboration. A typical line balance function will make available to the RTO 210 through the database 208, a value, known as the line balance divergence, representing the change in the imbalance of the line balance calculation over a short period of time, typically a few minutes. The RTO 210 provides analysis on the trend of the line balance divergence to corroborate the results of the pressure wave detection. The trend is determined by comparing the slope (or other mathematical or statistical comparison) of the line balance divergence over time from before the pressure wave 301 with the slope of the line balance divergence over time from after the pressure wave 301. The slope of the line balance divergence is calculated by the RTO 210 by storing a number of values of the line balance divergence for predetermined time intervals. Under the exemplary method, the slope is then determined by the following equation:

Slope=(latest line flow divergence value−oldest line flow divergence value)/(current time−oldest time)

A specific example of this operation of the RTO 210 is illustrated as pseudo code under "Get Line Flow Data" in Appendix A. The slope prior to the pressure wave 301 is compared with the slope after the pressure wave 301. If the slope has increased by a value greater than that of a pre-configured parameter, the trend of the line balance divergence has changed as a result of the pressure wave 301, and this information corroborates the possibility of a rupture 300. Beneficially, this corroboration will occur prior to the line balance function determining that there is a rupture 300. As multiple independent corroborating data permits a lower indicative line balance divergence to further support rupture likelihood.

The RTO 210, by placing data into the database 208, notifies the operator of the pipeline that a possible destabilizing event has occurred based on pressure wave detection and other corroborating evidence. This includes the creation of an incident report. A specific example of the operation performed by the RTO 210 is illustrated as pseudo code under "Create Incident Report" in Appendix A. The RTO 210 may report different levels of certainty to the operator based on the level of evidence available. An exemplary set of reporting levels is shown further in Table 1 below. Level 1 represents the highest level of certainty that a rupture 300 has occurred, while Level 4 represents a lower level of certainty. As the RTO 210 obtains further evidence the level being reported to the pipeline network 100 operator may change.

TABLE 1

|  |  |  | One Trigger | Two Trigger Same Station | Two Trigger One Sided | Two Trigger Bracketed Spanned | Two Trigger Bracketed Not Spanned |
|---|---|---|---|---|---|---|---|
| No Pressure Decay | No Line Flow Divergence | No Line Balance | Level 4 | Level 4 | Level 4 | Level 4 | Level 2 |
|  |  | Line Balance | Level 4 | Level 4 | Level 4 | Level 4 | Level 2 |
|  | Line Flow Divergence | No Line Balance | Level 4 | Level 4 | Level 4 | Level 4 | Level 2 |
|  |  | Line Balance | Level 4 | Level 4 | Level 4 | Level 4 | Level 2 |
| Pressure Decay | No Line Flow Divergence | No Line Balance | Level 2 | Level 2 | Level 2 | Level 2 | Level 1 |
|  |  | Line Balance | Level 2 | Level 2 | Level 2 | Level 2 | Level 1 |
|  | Line Flow Divergence | No Line Balance | Level 1 | Level 1 | Level 1 | Level 1 | Level 1 |
|  |  | Line Balance | Level 1 | Level 1 | Level 1 | Level 1 | Level 1 |

Figure 4:
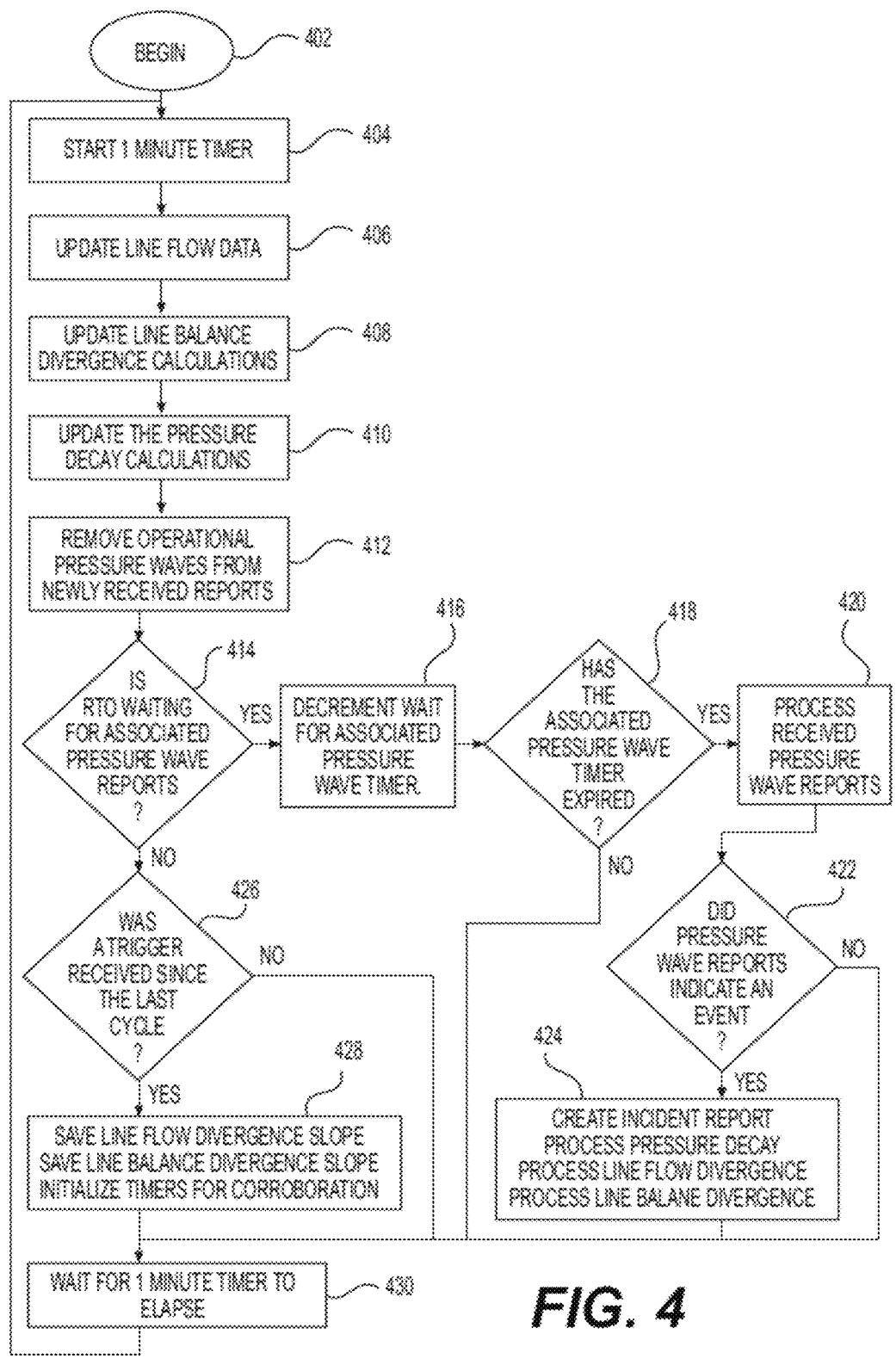
FIG. 4 is an exemplary embodiment of a display shown to a pipeline operator in the control center of FIG. 1 in accordance with aspects of the present techniques.

FIG. 4 is an exemplary flow chart depicting the use of the RTO 210 in the pipeline network 100 with the SCADA unit 202. An operator of the SCADA unit 202 may utilize the RTO 210 to monitor the destabilizing event detection for the pipeline network 100, as described below.

The operation of the system in accordance with the present invention will now be described in connection with FIG. 4. The operation is initiated at step 402. A timer is then started in Step 404 to allow for later re-execution of the logic at short time intervals. The data collected, stored in database 208 and used for line flow trend analysis is updated at Step 406 to provide corroborating evidence for any possible destabilizing event detections. The data produced by the line balance functionality of the SCADA Application 204 is then collected and analyzed in Step 408 for possible future use in corroborating destabilizing event detections. The current pressures are retrieved from the database 208 in Step 410, stored within the RTO 210 and analyzed for future use in corroborating destabilizing event detections. Any newly received pressure wave reports are evaluated in Step 412 against changes in measured parameters in the pipeline network 100 to determine whether or not the pressure wave report was caused by operational activity. If the wave report was caused by operational activity, it is removed from the list of pressure waves 300 to be analyzed by the RTO 210.

In Step 414 a determination is made whether or not the RTO 210 is waiting to receive additional pressure wave detection reports associated with a previously received report. The waiting time in Step 414 differs from the timer set in Step 404. The period is shorter. The waiting time in Step 414 is based upon the wave speed length. The waiting time is set based upon slowest possible wave speed. If a pressure wave is detected, then the waiting time will be based upon the time it would take to receive another pressure wave if such pressure wave had the slowest possible wave speed. If the determination is yes and the RTO 210 is waiting for associated reports, then the operation of the system proceeds to Step 416. If the determination is negative (i.e., no associated pressure reports are received) then the operation of the system proceeds to Step 426, which is discussed in greater detail below.

Figure 5:
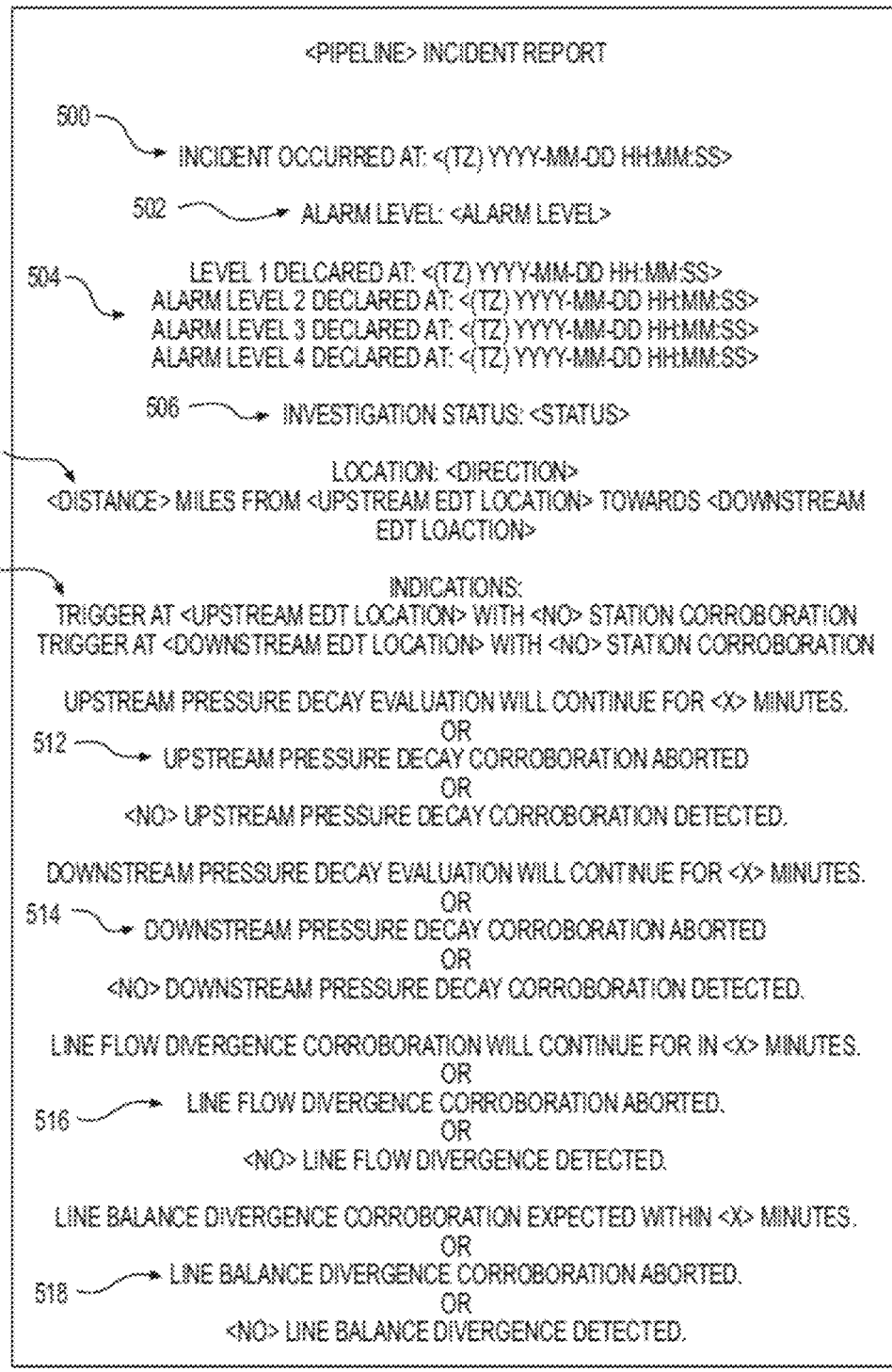
FIG. 5 is an exemplary embodiment of one the logic flow in one of the aspects of the present techniques.

In Step 416, the counter associated with waiting for associated reports is decremented. This counter is then examined in Step 418 to determine if the waiting period has expired. If the waiting period has expired and an associated pressure wave report is received, then all of the received pressure wave reports will be processed in Step 420 to determine whether there are bracketing detections, or a single detection, the possible associated location and alarm level. In Step 422, a determination is made as to whether or not the analysis performed in Step 420 found a possible rupture. If a possible destabilizing event was found, the operation proceeds to Step 424 where an incident report is created, as shown in FIG. 5 and the corroborating factors examined to determine if corroboration has occurred. A notice and/or an automatic soft pipeline spooldown, or corrective measure algorithm is executed along with the incident report such that the operator of the system can take appropriate measures to isolate the leak and limit spills from the pipeline. The operation of the system then proceeds to Step 430 where the system waits until the timer activated in Step 404 expires. The operation then returns to Step 404 where the process is repeated. If no possible destabilizing event is identified, then the operation proceeds to Step 430 where the system waits until the timer activated in Step 404 expires. The operation then returns to Step 404 where the process is repeated.

Returning to Step 414, if it is determined that the RTO 210 was not waiting for associated reports, then the operation of the system proceeds to Step 426 to determine if a new pressure wave detection has been received. If no pressure wave detection is received, the operation of the system proceeds to Step 430 where the system waits for the timer set in Step 404 to expire. The steps are then repeated with the setting of the timer in Step 404. If a new pressure wave detection is received in Step 426, the operation of the system proceeds to step 428 where the initialization of the data records for tracking the new pressure wave, the setting of a timer to wait for associated pressure wave detections, and the saving of the pre-detection corroboration values for future analysis occurs. The operation of the system then proceeds to Step 430, where the system waits in the manner described above.

As discussed above in connection with Step 424, an incident report is created when a pressure wave reports indicates the occurrence of an event. The incident report may be presented via a graphical user interface to a display unit for the operator. An audible notification may also be provided. The graphical user interface may be a window provided to the operators via the SCADA unit 202, which includes graphical or textual data, a report or any other suitable data. An example of the graphical user interface is illustrated in FIG. 5.

The screen view is merely one example of an incident report that may be presented to an operator. As can be appreciated, additional operational settings and data may be presented in other embodiments.

The screen view in FIG. 5 is divided into various windows or sections. For instance, section 500 reports the date and time at which the first pressure wave detection occurred. Section 502 reports the current alarm level assigned to the pressure wave detection using the customizable alarm level matrix presented in Table 1, above. Because the alarm level assigned to the analysis of a possible destabilizing event detection may change over time, as more corroboration evaluation is completed, the date and time at which each level of alarm was reached is displayed in section 504. If a certain level of alarm was not reached for a particular detection, it is not displayed in this section.

Section 506 is used to track and report whether the investigation launched by the operator has been completed or not. If the analysis by the RTO 210 was able to determine a location (bracketing detections, or two detections on one side of the rupture) this is reported in section 508. Section 510 provides detailed information on the pressure wave detection(s) that were used to arrive at the location by the RTO 210 during its analysis. Section 512 reports the status of the pressure decay corroboration for the upstream station used in the detection, if it exists, whether it is still in progress, or if complete, whether corroboration was found or not. Section 514 reports the status of the pressure decay corroboration for the downstream station used in the detection, if it exists, whether it is still in progress, or if complete, whether corroboration was found or not. Section 516 reports the status of the line flow divergence corroboration, whether it is still in progress, or if complete, whether corroboration was found or not. Section 518 reports the status of the line balance divergence corroboration, whether it is still in progress, or if complete, whether corroboration was found or not.

Rogue Wave Detection

In still another embodiment RTO 210 can function as a rogue wave detector (RWD) using high speed event and process condition chronology (Phase 1), kinetic energy analysis (Phase 2), and potential energy analysis (Phase 3). Phases 2 and 3 may also be referred to as "conservation of kinetic energy" and "conservation of potential energy," respectively, or "conservation of energy," collectively. In the following description single variable analysis is utilized for concept illustration, but the operating theory is directly extendable to multi-variable analysis of threat detection for all phases across a pipeline node or throughout a pipeline network. Some potential multi-variable diagnostic sets include, e.g., (a) for a pump station: pump suction, case, and discharge pressures, and flow rate if available; (b) for an origin or metered station: flowrate and associated nodal pressure(s); (c) for a) or b): variable frequency motor drive speeds (VFD Hz), control valve positions, other pipeline flow modifying equipment operating/control values or conditions; and (d) for a pipeline network or system: a), b), and c) in any combination. To maximize the practical nature of this technology and therefore its range for application candidacy across the broad array of pipeline system types, 'Conservation of Energy' is applied in a qualitative manner and is not sought thru a mathematical model. However, the RWD method is extendable to modeling techniques.

Ruptures often generate a pressure wave possessing a sharply decompressing leading edge having a very high negative pressure slope value indicating an uncharacteristically rapid downward 'step' in pipeline pressure. One exploitable trait of a typical rupture wave is that it generates aggressive process variable reactions that can often clearly be shown to be unaccounted for by normal operating events, equipment action, or process changes. RWD applies high speed chronology and energy calculations to identify the source of high magnitude negative pressure wave events that occur within liquid pipeline systems—if the generating 'source' is unaccounted for by a pipeline element, operational change, control center command for equipment action, or process change, then RWD identifies the event as a possible rupture threat.

Figure 6:
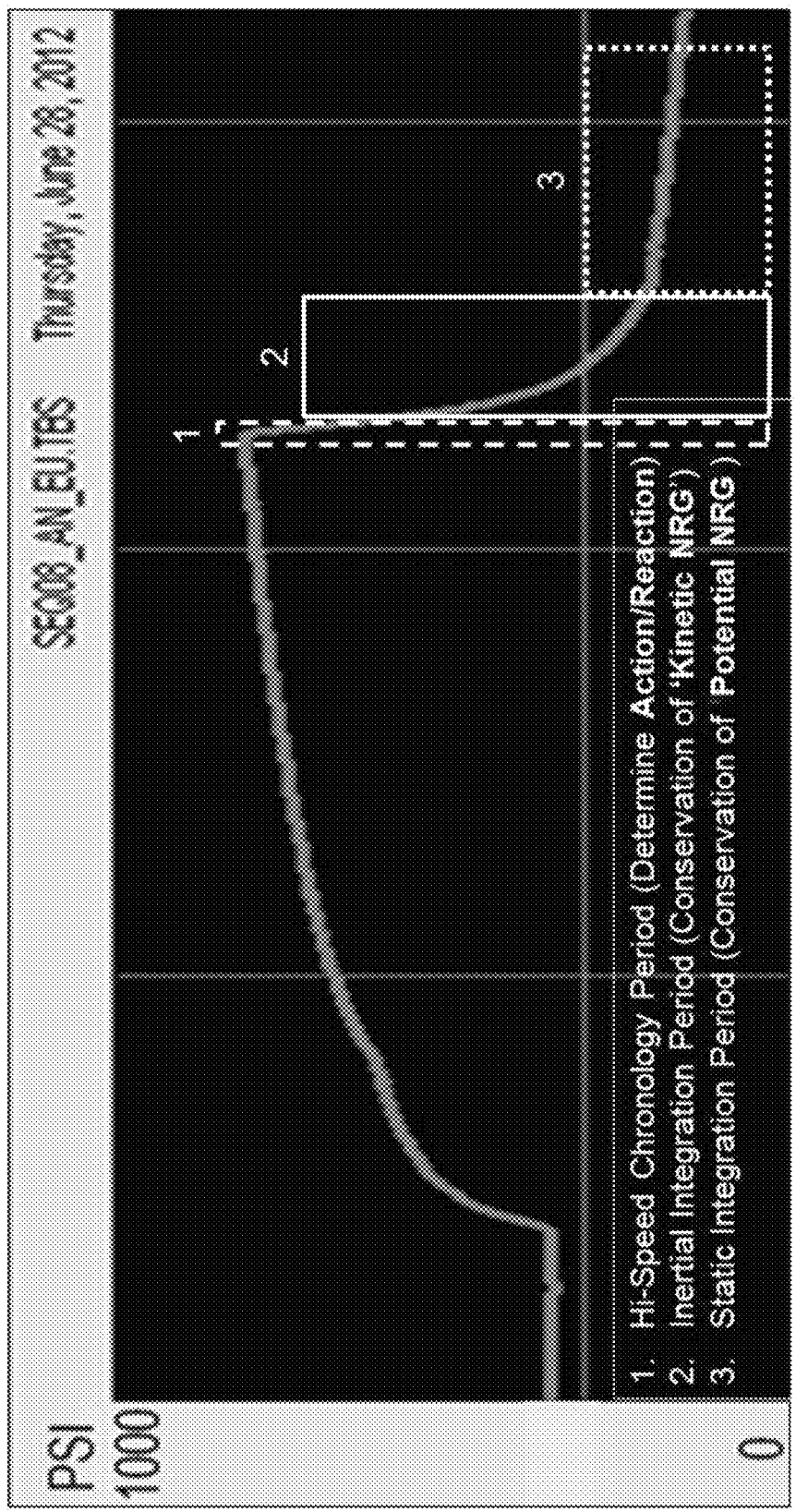
FIG. 6 is a graphical depiction of three phases and techniques used to detect a rupture threat during each phase of a rupture wave's characteristic effects on a driven pipeline segment.

In this embodiment, RTO 210 produces high speed time-stamped triggers associated with uncharacteristically rapid segmental decompressions. These time-stamped events are key in determining whether a particular pressure wavefront is an action imposed across a pump station (possibly by a rupture event), or simply the reaction to a commanded (or intended) pump driver 113*a*-113*n* stop. As shown in FIG. 6, the period of interest for this determination is quite small—indicated by the phase 1 time rectangle.

Phase 1 chronologically orders key pipeline system events along with hydraulic reaction target points (such as 'low discharge pressure pump trip point') over the impact period of a rupture wave as it travels through a pipeline pump/other relevant station. The resulting histogram provides critical information that significantly improves the level of certainty for determining causal factors responsible for the 'un-commanded' generation of large scale negative pressure waves within pipeline systems (e.g. pump unit was not 'commanded' to stop by human controller or protective PLC/PV switch/other logic). Un-commanded pump trips (particularly those caused by low suction pressure or low discharge pressure protective switch activations) represents a critically important decision point for pipeline transportation operation control centers.

It is possible for a typical multi-segment crude or product pipeline system to have hundreds of un-commanded pump trips per year. It is critical to note that un-commanded mainline pump trips are capable of generating high magnitude negative pressure waves resembling rupture wave events. Typical liquid pipeline system pump trips (commanded and uncommanded) generate a large scale negative pressure wave as a result of the pump's (or compressor's, etc.) rapid deceleration. One way to view this is that a restart decision is required following each un-commanded pump trip event (effectively resulting in hundreds of rupture/no rupture decisions per year by pipeline control centers). An analysis that determines whether these aggressive negative pressure waves are the reaction to intended pump stoppage (even if un-commanded) or due to a process variable (or set of process variables) movement potentially associated with a rupture wave is needed. An effective action/reaction accountability application could significantly improve pipeline control center critical restart decisions—especially those following un-commanded pump trips.

Figure 7A:
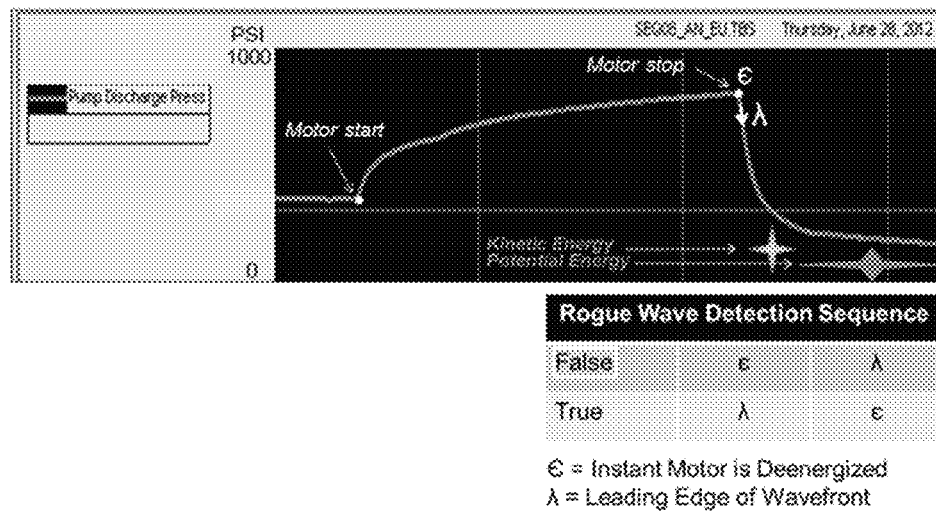
FIGS. 7A and 7B are graphical depictions of a rogue wave detector's (RWD) phase 1 analysis using high speed sequence of events chronology to detect a typical rupture wave event that occurs within a driven pipeline segment.
Figure 7B:
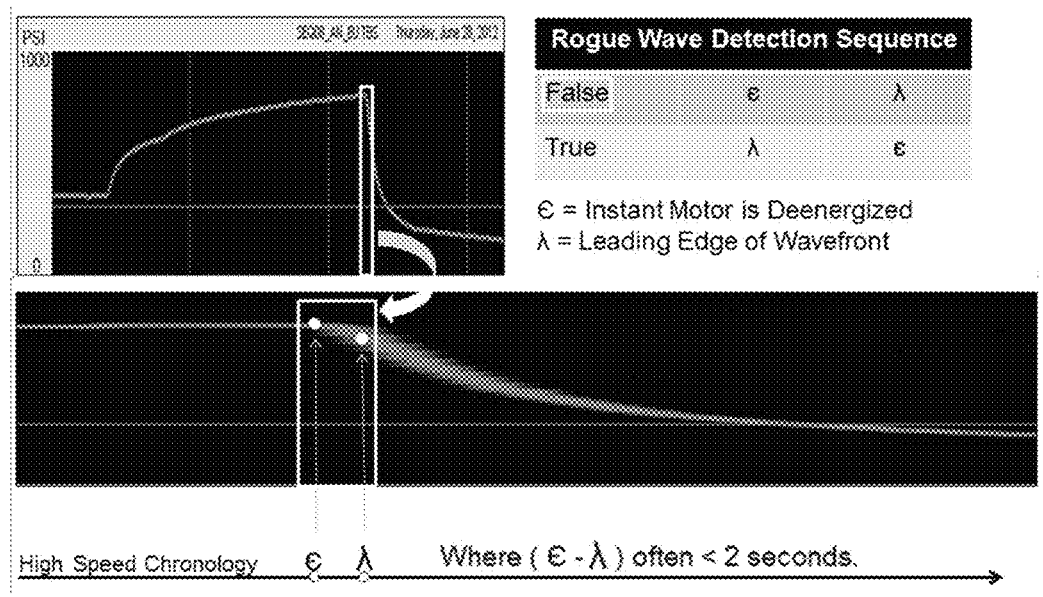
Figure 8A:
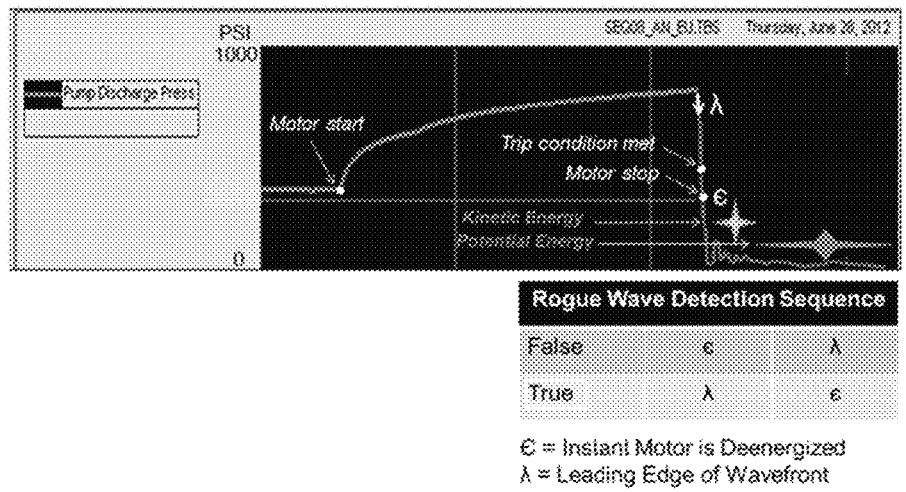
FIGS. 8A and 8B are graphical depictions of the RWD's phase 1 analysis showing the sequence of rupture characterizing events.
Figure 8B:
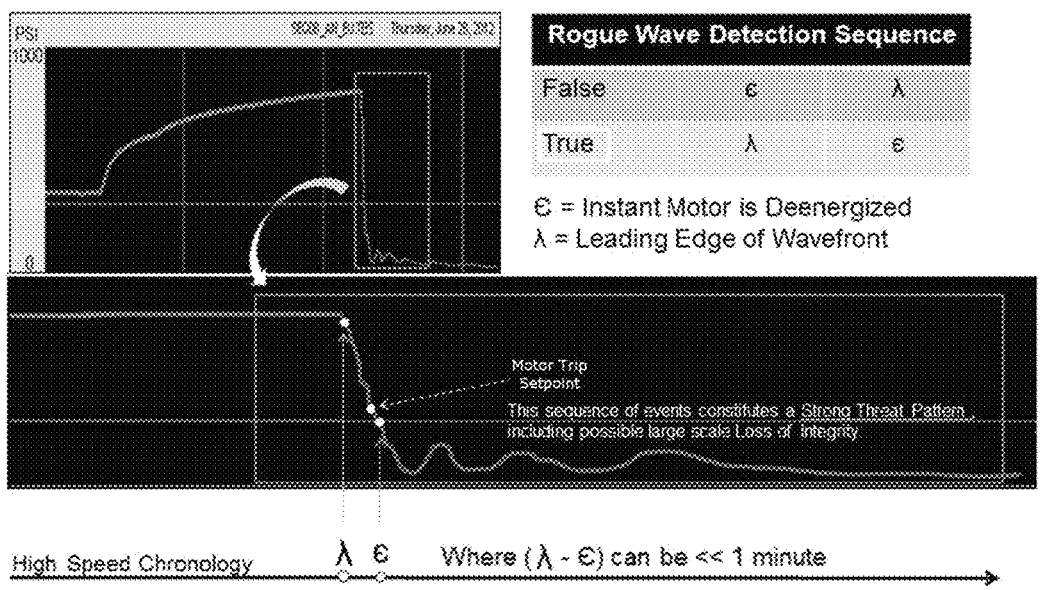

The objective of phase 1 analysis is to determine whether the sensed and unaccounted for pressure wave is an action or reaction event. FIG. 7A and FIG. 7B provide graphical depictions where the two key events are under examination: 1) the potentially threatening pressure wave (a lambda timestamp from RTO 210) and 2) a pump or other equipment's trip or countering reaction (setpoint track or protection of envelope boundaries) that is directly related to the same potentially threatening pressure wave. RTO 210 programmable logic controllers (PLCs), in this embodiment, better enable the fidelity, sampling speed, and logic to build a histogram along the often brief period of interest but other data collection and computational systems would also apply. PLCs (or other local processors/equipment) are typically capable of higher speed process variable and equipment event/condition sampling than common pipeline SCADA systems. Specifically, RTO 210 in phase 1 performs analysis to determine whether a pipeline pump station's motor (or other driver type) spontaneously shutdown due to various potential normal reasons, such as depicted in FIG. 7A and FIG. 7B, or that a large scale rupture wave rapidly travelled thru the pump station and due to the severity of hydraulic reactions caused the subject pump unit(s) to shut down on protective devices or a potentially abnormal condition, such as depicted in FIG. 8A and FIG. 8B. In a normal case, FIG. 7A and FIG. 7B, the pump's motor is deenergized before a wavefront is detected. In other words, the pump's deceleration is the actual cause of the pressure wave. In the case of a rupture, however, as the pressure drop wavefront associated with the rupture travels through a pump station, the pump discharge pressure descends through the low discharge pressure trip or other pump driver (e.g. motor, etc.) trip setpoint, and the pump driver would deenergize after the wavefront is detected. This is depicted in FIG. 8A and FIG. 8B where the leading edge of the wavefront occurs earlier in time than the instant the motor is deenergized.

As described above, when a rupture wave is sufficiently large, it can induce un-commanded pump trips (commonly referred to as pump Op-Trips or Lockouts) for which the subsequent transitional disturbances and intervening equipment actions could present a challenging causal analysis case to the pipeline's control center. In these instances, the pressure wave's transitory period will be modified by the rupture-related loss of line 'pack' (fluid compression). The pressure character across phase 2 associated with pump shutdowns (see phase 2 time rectangle in FIG. 6) is monitored for normal behavior.

Figure 9:
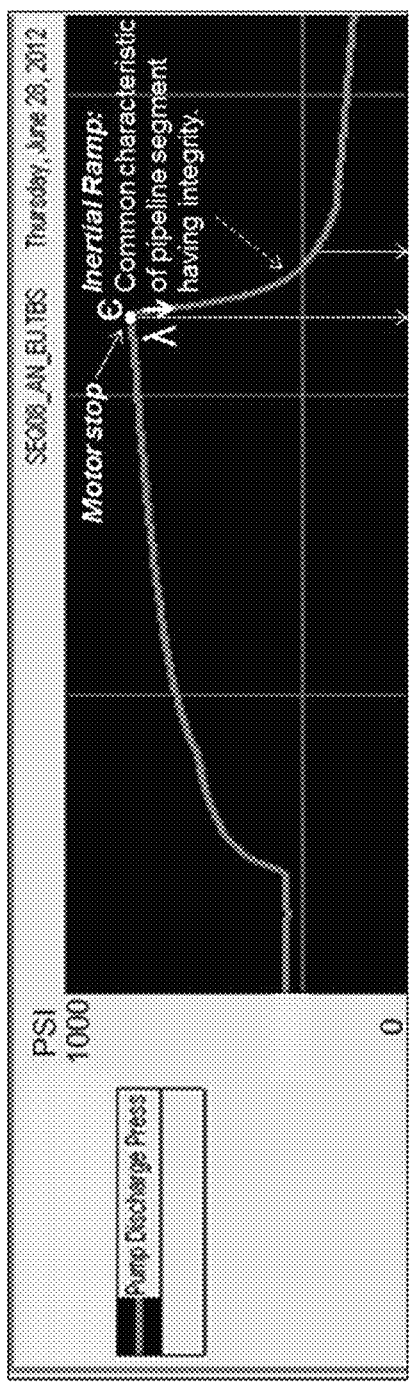
FIG. 9 is a graphical depiction of the RWD's phase 2 analysis using high speed integration of the pressure variable.
Figure 10:
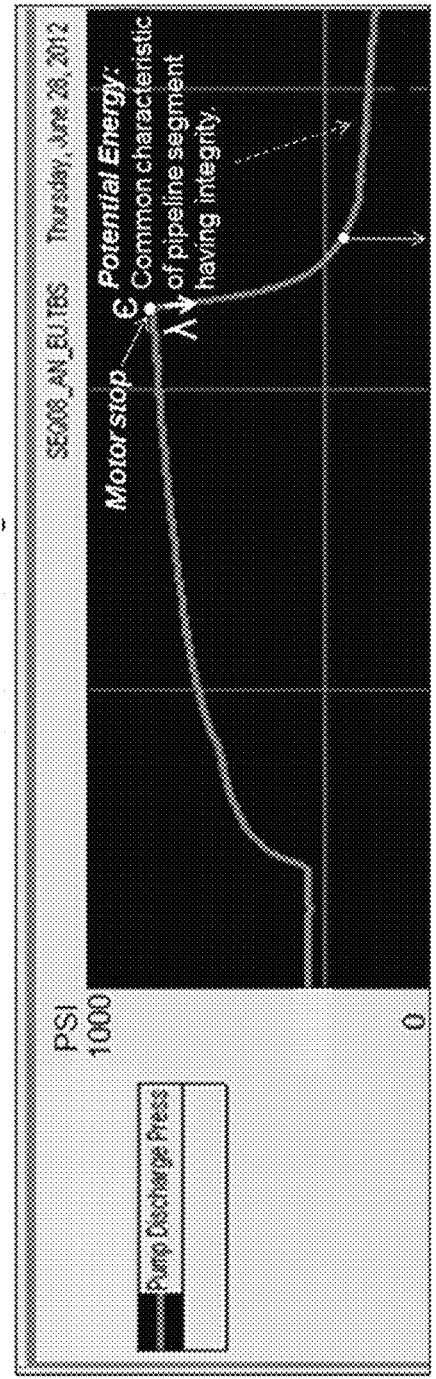
FIG. 10 is a graphical depiction of the RWD's phase 3 analysis using high speed integration of the pressure variable.
Figure 11:
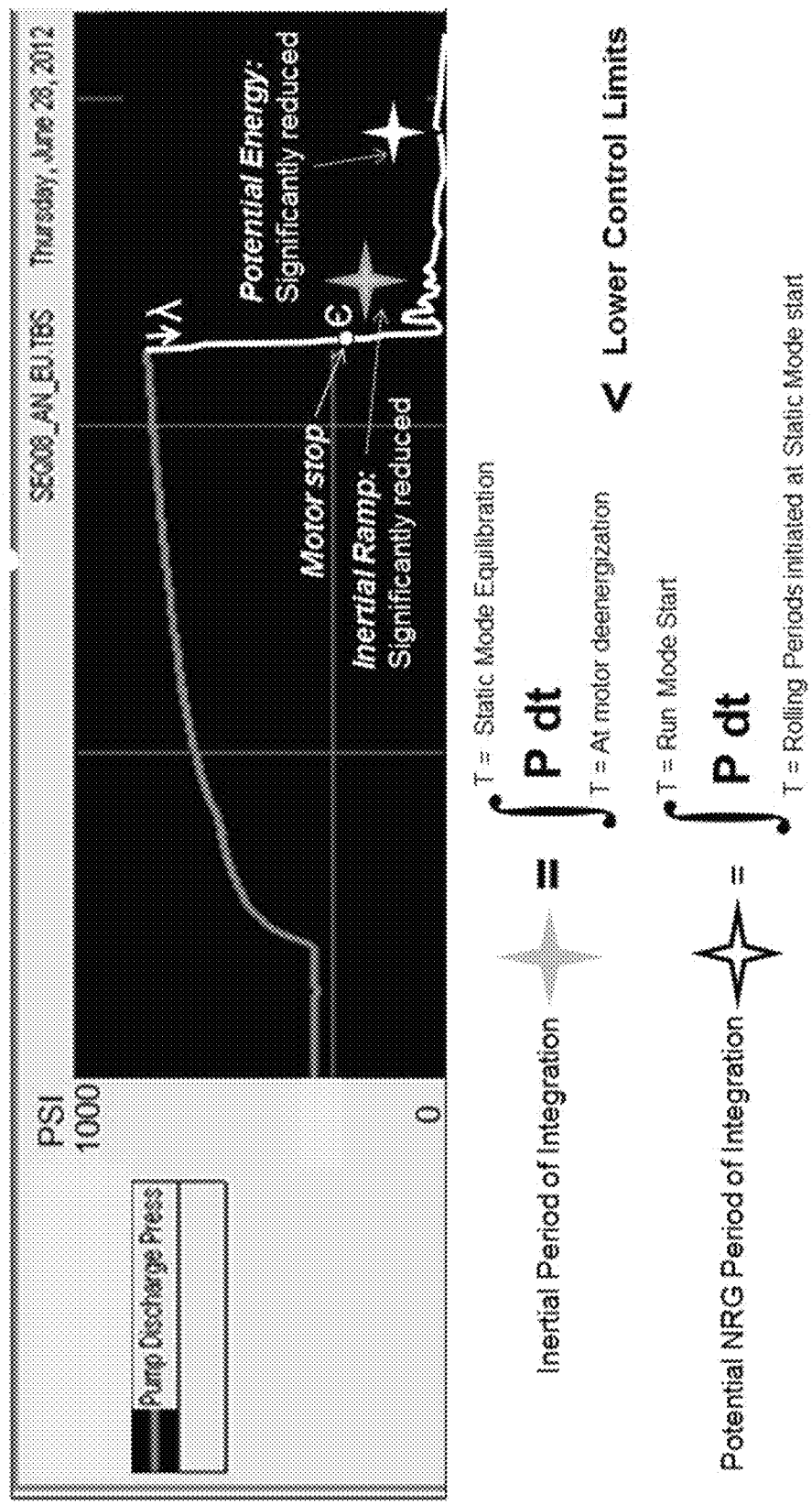
FIG. 11 is a graphical depiction of the RWD's phase 2 & phase 3 mathematical analysis in one of the aspects of the present techniques.

Immediately following a pump stop, RTO 210 performs high speed pressure signal integration(s) over the transitory period to identify unreasonable pipe segment decompression (pack loss) compared with empirically determined (or mathematically modeled) normal pack loss behavior. When a pump driven pipeline segment is operating in steady-state, the fluid within that segment is typically compressed relative to the external environment. This pressure acts omni-directionally within the same closed pipe segment including against RTO 210 pressure monitoring instrumentation. After a pump shutdown, this omni-directional pressure decays over time as fluid in the pipeline has lost its driving force. Transient related pressure oscillations can occur, but provided additional pump units are not energized following the subject pump(s) trips, the overall result is a marked reduction in applied energy (potential energy and kinetic energy) into the subject pipeline segment over the period of time relevant to phase 2 inertial integration analysis. This decay is depicted for a normal pump shutdown in FIGS. 9 and 10 and for a rupture in FIG. 11. A comparison in the different curves is show in FIG. 12.

The decompression signature commonly reveals itself as a decaying pressure signal curve directly following a pump shutdown and often possesses a useful degree of character repeatability. That is, the 'spring action' that generates the pressure signal's curvature (or area under the pressure curve) directly following a normal pump shutdown is generated from the hydrocarbon material being fully contained and actively compressed or 'packed' within the pump driven segment. When a step-function relaxation of the driving action occurs, such as pump stoppage, the energy stored that was applied to the subject segment by the deenergized pump is within the compressed (potential energy component) and moving (kinetic energy component) material and exerts itself across the segment until a new equilibrium is reached (dynamic or static in the case where the stopped pump was the final or only operating pump to be de-energized). This useful degree of pressure decay character repeatability can be used to empirically generate normal pack loss envelopes for a given pump & driver combination when a normal shutdown (pipeline integrity intact) occurs during specific modes of pipeline operation (pump configurations, batch lineups, delivery network alignment, etc.).

Because the subject pipeline segment is part of a closed network, a finite amount of time is required for the energy recently applied by the pump and partially stored as fluid compression and flowrate to decay to the idled segment or reduced pipeline energy level. In the case where the pipeline has multiple pump drivers online, a rupture induced un-commanded pump trip of a subset of the overall set of active pump units will bring the pipeline system to a lower dynamic energy state. For a particular pump and pipe segment pair, an empirical review of a representative sample set of pump off decay periods between the driven pressure level and the un-driven segmental pressure level (full or staged pressure reduction depending on whether some pump units remain on-line following the rupture event) reveals a kinetic energy decay dominantly characterized by: 1) pipeline mode (pump configuration, pipeline network delivery alignment, etc. which describe kinetic energy level), 2) product assay (viscosity, seasonal/climate flowability, etc.), and 3) the particular pump unit(s) de-energized (motor horse power and pump curve). Normal pump removal envelope characterizing elements are limited, therefore the control limits detecting a pipeline rupture can be: 1) empirically determined for disciplined transport modes, 2) positioned around the expected normal kinetic and potential energy decay character, and 3) designed to alarm when the expected level of resistance to pressure decay is absent over the inertial energy integration time period for the subject segment following the pump shutdown from a known and phase 2 configured pipeline mode of operation. FIGS. 6-10 illustrate a pump driven segment where flowrate is not available, however, flowrate accelerations (positive and/or negative acceleration depending on meter locations) can be analyzed similarly to corroborate rupture threat detection within Rogue Wave Detection's method.

Figure 12:
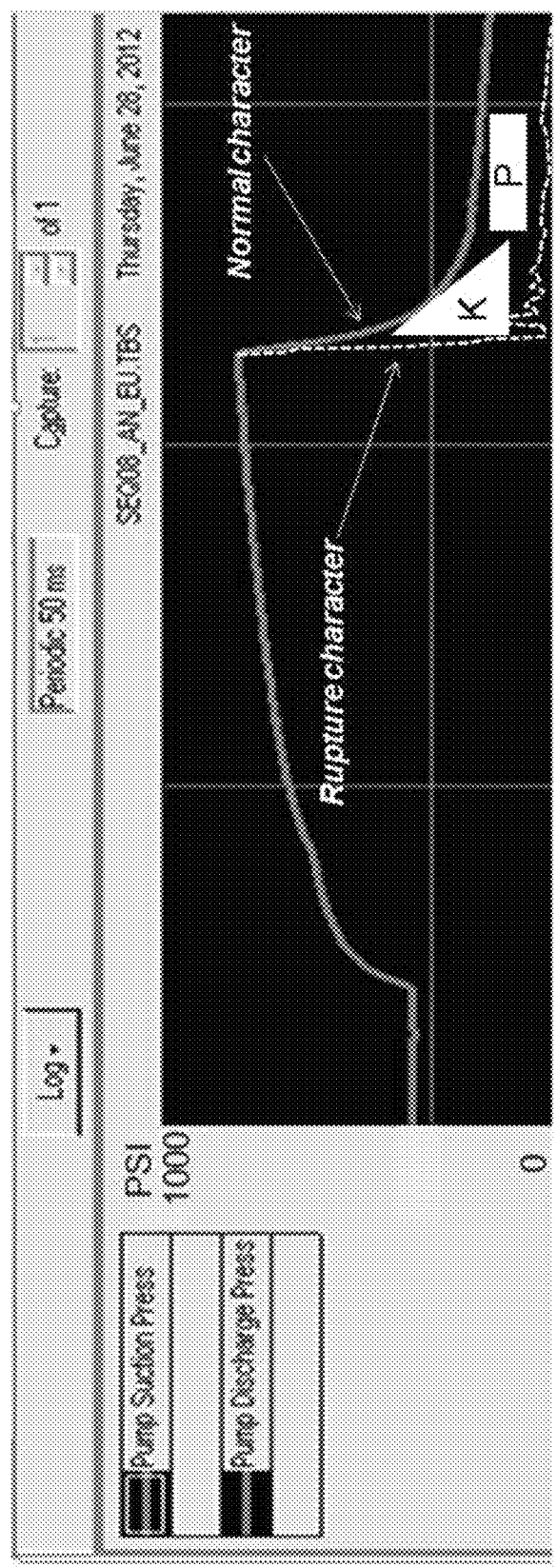
FIG. 12 is a graphical depiction of a rupture wave's kinetic energy (phase 2) & static energy (phase 3) key regions and integration areas ('K' & 'P' areas under the pressure curve) overlaid onto both a normal and simulated rupture shutdown scenario.

The normal and characterizing decay curvature of a pump station's discharge pressure and pipe segment pair can be empirically determined when the pipeline system is operated under an appropriate level of operational discipline. Control limit envelopes can be empirically derived to monitor for a catastrophic/significant loss of containment under the RWD's Phase 2 Inertial Energy Integration subroutine. With reference to FIG. 12, if the area within the "K" region is not present following an uncommanded pump shutdown as normal shutdowns empirically demonstrate it to be, the "Kinetic Energy" integration test of phase 2 fails. Likewise, if the area withing the "P" region is not present following the same shutdown, then the "Potential Energy" integration test fails. These, integrations are applicable to non-shutdown rupture conditions as well (e.g. a smaller scale rupture that does not result in an uncommanded pump trip, but does satisfy similar criteria as set against steady-state empirically determined normal hydraulic (pressure, flowrate, or combinational analysis) profile behavior.

Consider that when a rupture occurs, fluid mass escapes the affected pipeline segment and the pipeline system is no longer a closed network. The fluid column previously under tight compression within the ruptured pipe segment rapidly loses a considerable section of its compressed fluid spring column (the driven segment's length and diameter relationship(s) define the compressed fluid spring column). The sub-component of the fluid spring that escapes the affected segment is no longer available to impress itself onto the RTO 210 pressure monitoring instrumentation after the pump(s) trip offline so equilibration pressures levels are typically materially reduced Pump(s) can trip offline due to a rupture's pressure & flow impact across the pump station. The resulting rapid decompression within the segment signifies a loss of energy directly related to the loss of compressed fluid mass that escapes thru the ruptured section of the pipe segment. In this case, the monitored pressure signal should reveal the loss of material as an uncharacteristically large loss of area under the pressure signal trend line over the phase 2 period (see FIG. 12). That is, the escaped compressed fluid material was not available as contained segment pack (potential energy in the previously closed network segment) to impress itself onto RTO 210 pressure monitoring instrumentation following the pump(s) stoppage and the pressure drop is uncharacteristically fast.

A pipeline segment, once idle (zero flow rate), containing a rupture-related loss of integrity typically undergoes a rapid decompression that is often quickly detectable following a pipeline system shutdown (See phase 3 time rectangle in FIG. 6). Gravity-Zero Pressure (GZP) represents the pressure level sensed by the subject pressure monitor(s) when the pipeline system has integrity, is fully filled, fully relaxed—no compression or potential energy exists above the external environments ambient condition at the highest elevation point in the closed segment containing the subject pressure monitor(s) and is in a normal idle and valve isolated condition.

When a pipeline system is brought to rest, it is typically segmented thru a series of valve closures. These pipeline sub-segments often maintain a non-gravity-zero pressure in the static condition due to partial line pack or vacuum entrapment within the isolated pipeline segments following the transition from the dynamic to static mode. This result together with the fact that the segment is no longer "driven" (new fluid material is not being actively driven into the segment by a pump fed from a fluid supplying source, such as a pipeline refinery or breakout tankage) provides a highly effective condition under which to monitor for losses of material containment.

Typically, the point in a pipeline segment where a rupture occurs rapidly equalizes to near the ambient environment's pressure condition. So for even relatively small entrapments of pressure (compression or vacuum) empirically determined as typical, properly monitored nodes would quickly reveal that the characteristic potential energy (+/- potential energy Δ from gravity-zero) is not present. The probability that a loss of integrity condition exists would be a function of the empirically determined normal potential energy magnitude (normal pressure value when idle) and the pressure entrapment reliability in normal (pipeline integrity intact— graphically depicted in FIG. 10) and similarly segmented conditions as shown in the "Potential NRG Period of Integration" in FIG. 11 and the 'P' rectangle in FIG. 12.

Closed pipeline networks conserve pipeline "pack" energy in the form of potential energy when simple enabling design criteria are met. Primarily, sealing valves and idle conditions that entrap some degree of pressure (+/-) Δ from gravity-zero pressure. This simple condition enables highly effective loss of integrity detection methods when properly designed and applied. A segment that produces a phase 1 and/or phase 2 alarm can activate phase 3 analysis to check for the presence of the potential energy empirically demonstrated as available during idle mode cases of known pipeline integrity. A phase 2 and/or phase 3 alarm would further corroborate a loss of integrity condition within the subject segment adding certainty to the rupture detection alarm. Phases 1, 2, and 3 alarms could be employed as autonomous alarms when associated with un-commanded pump trips. This could provide important widely deployable automated pipeline integrity checks.

As for phase 3, a pipeline segment containing a rupture-related loss of integrity typically undergoes a rapid decompression. Once the pipeline is idle, the decompression descends to, or below, the Gravity Zero Pressure of pressure monitor(s) exposed to the same segment. This rupture related pressure reaction is often quickly detectable during shutdown transitions (kinetic energy integration) and the subsequent idle mode (potential energy integration). This is a useful observation that is relevant for all systems that maintain a prime differential relative to gravity-zero. A complete loss of prime represents a strong threat condition where prime is defined by a differential static pressure between 1) internal monitored pressure and 2) gravity-zero for that same pressure monitor (where gravity-zero represents the pressure level sensed by the subject pressure monitor(s) when the pipeline system has integrity, is fully filled, fully relaxed, and is in a normal idle and valve isolated condition).

In this embodiment, RTO 210 analyzes rupture wave impact and post impact periods to detect three key phases of rupture characterization that commonly occur at pipeline pump stations (or similar pipeline flow affecting stations) through which a rupture wave has travelled. Many long hi-throughput pipeline systems do not have a flow meter within each pump driven segment which can complicate loss of containment analysis for pipeline control centers particularly following an unintended pump shutdown (such as an electrical fault, low suction pressure, Op-Trip, etc.). This rogue wave detection function of RTO 210 utilizes hi-speed pressure and event analysis to establish key operational events (motor stoppage, process/equipment protective trip points, etc.) and process variable event chronology.

Figure 13:
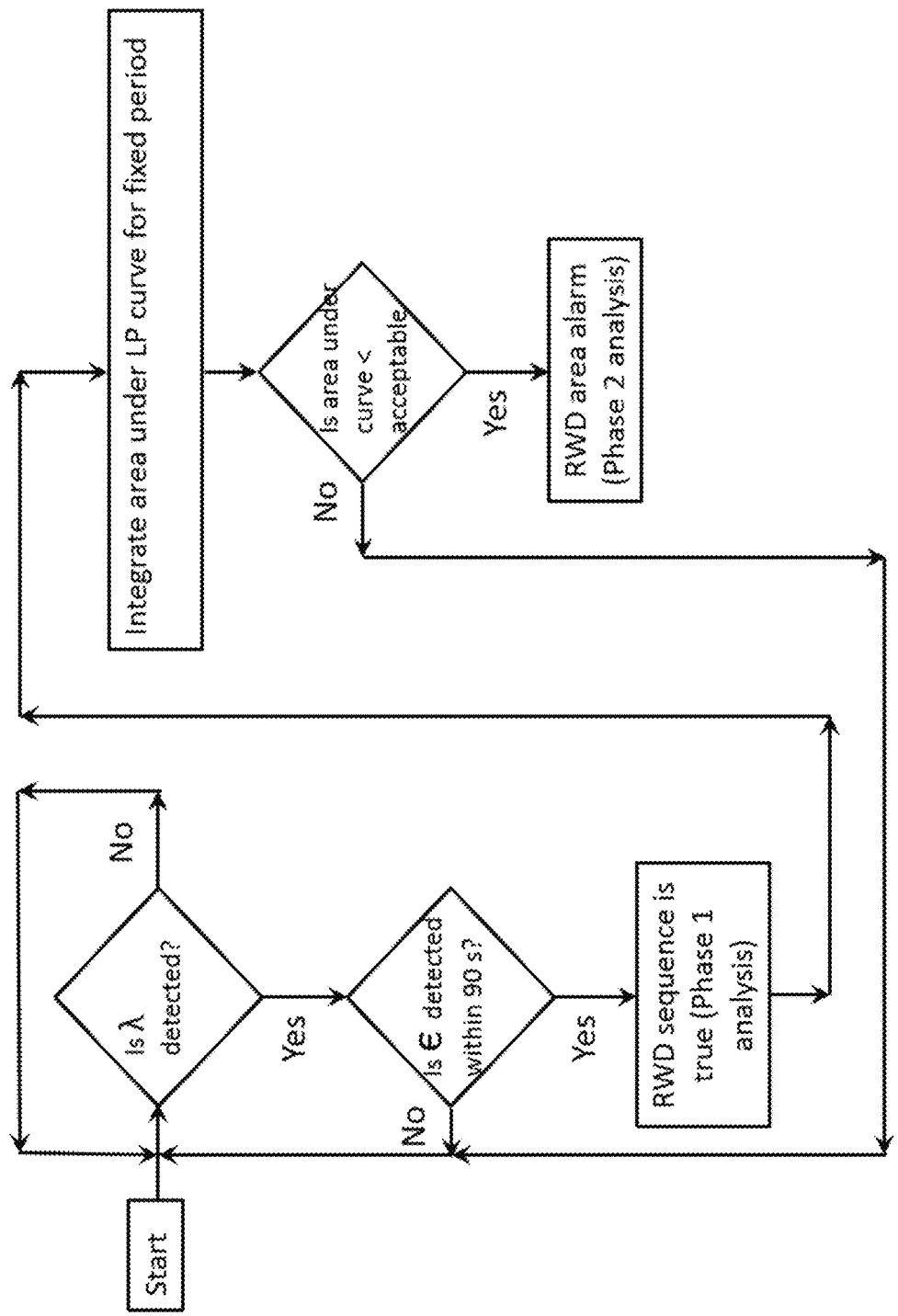
FIG. 13 exemplary embodiment of one the logic flow in one of the aspects of the present techniques.

FIG. 13 shows an example decision analysis RTO 210 can perform to provide rogue wave detection. At the start, RTO 210 determines whether it senses the leading edge of a pressure wavefront. If yes, then it is determined whether a motor is deenergized within 90 seconds after the pressure wavefront. This signifies that rogue wave detection phase 1 is true and analysis begins by integrating the area under the pressure curve. If the area under the pressure curve is less than the acceptable area determined by normal motor stoppages, then a phase 2 alarm is generated.

Idle Mode Analysis

In yet another embodiment, RTO 210 can provide rupture or leak detection in idle mode. Idle mode is a special case mode where the pipeline system is calm with no equipment action imparting forces into the network's fluid column(s). This condition enables highly sensitive detection methods to be applied with instrumentation and process control equipment. Important idle mode threat detection advantages include: 1) the pipeline segment of interest is not undergoing a continuous fluid packing and/or resupplying action by a pump fed from an upstream fluid source (refinery, tankage, or other source) and 2) a static state pressure 'noise' signature is small relative to the driven state because no mechanical actions are transferred into the segmented fluid columns.

Because the segments of interest are not being driven, if a discrete amount of fluid material is lost from the pipe segment the associated potential energy lost will not be partially or fully reapplied by a pump's action thru the injection of additional material drawn from an upstream fluid source, or from a pump's differential throttling, a variable frequency drive ("VFD") seeking setpoint(s) that are shifted off-track due to the process variables reactions to the loss of integrity, or other stored energy condition. Another important difference between idle mode and the transporting mode is that when losses of material occur in the transporting case, process equipment such as control valves and VFDs can begin aggressively seeking ideal process variable ("PV") setpoints assigned to each of the affected pieces of control equipment. Pipeline systems having multiple network connected pump/other control stations positioned along its length will often employ PV setpoint strategies with nodal objectives rather than system-wide network objectives. This nodal control (rather than coordinated system-wide) of PV setpoint objectives (e.g. VFD on pressure setpoint, CV on flowrate setpoint, etc.) can obscure and significantly complicate loss of integrity detection and analysis for pipeline control centers.

Additionally, the amount of thermally induced compressions and relaxations caused by daily or seasonal conditions often reveal repeating or tightly bounded behaviors that can be fitted with control limits on a dynamic (or rolling) basis. That is, when the limited and predictable behaviors provided above are specifically factored into an idle mode alarm design the result can be significant improvements in both loss of containment detection sensitivity and effectiveness.

Enabling RTO 210's Idle Mode Analysis (IMA) on a particular pipeline system is relatively simple. IMA can be employed in pipeline systems outfitted with industry standard pressure transmitter(s) sensing the segment of interest, sealing valves, and where each monitored segment entraps a moderate level of (+/−) pressure when transitioned from the transporting to idle mode. This represents a significant number of typical pipeline segments. IMA centers on the empirical determination of normal idle mode pressure behavior for a specific pipeline segment of known integrity when the pipeline system is idle (static) and isolated. Typical crude and products pipeline systems are often natural IMA candidates requiring little effort or investment to seal or precondition the pipeline's static mode entry or duration.

The three primary factors characterizing a candidate segment's pressure pattern are 1) fluid's temperature variation 2) the segment's valve sealing effectiveness, and 3) idle mode's typical pressure level entrapment. Dynamic (or rolling) standard deviation and/or integration based (or equivalent math) control limits can then be tightly positioned around this expected normal behavior. Corroborating process variable reactions can be referenced by the detection routine (such as temperature slope, PV rates of change, integrated values, differentiated values, etc.) to strengthen both the sensitivity and robustness of the IMA routine—including filtration enhancement.

Figure 15:
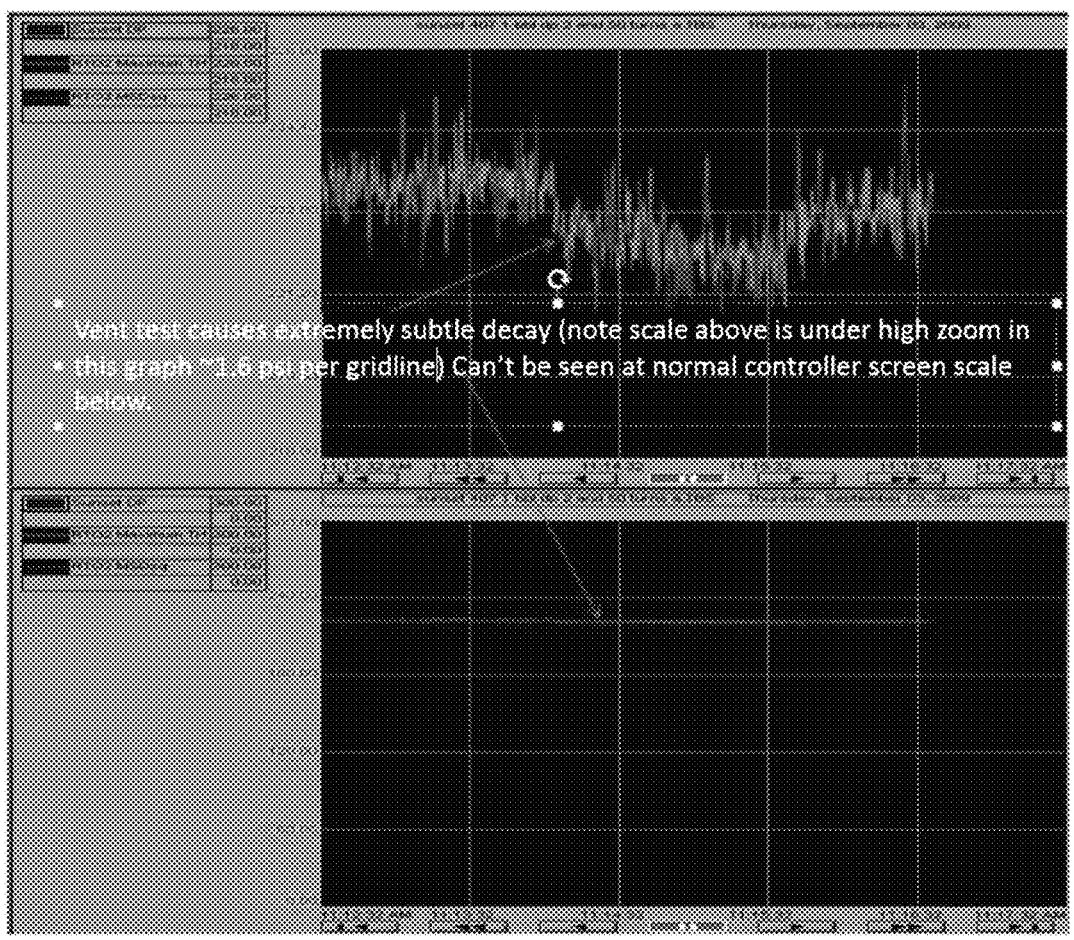
FIG. 15 is a graphical depiction of the characteristic subtle leading edge decay associated with very small losses of pipeline integrity (slow initiating and constant flow leak rates or temporary theft flow rate).
Figure 16:
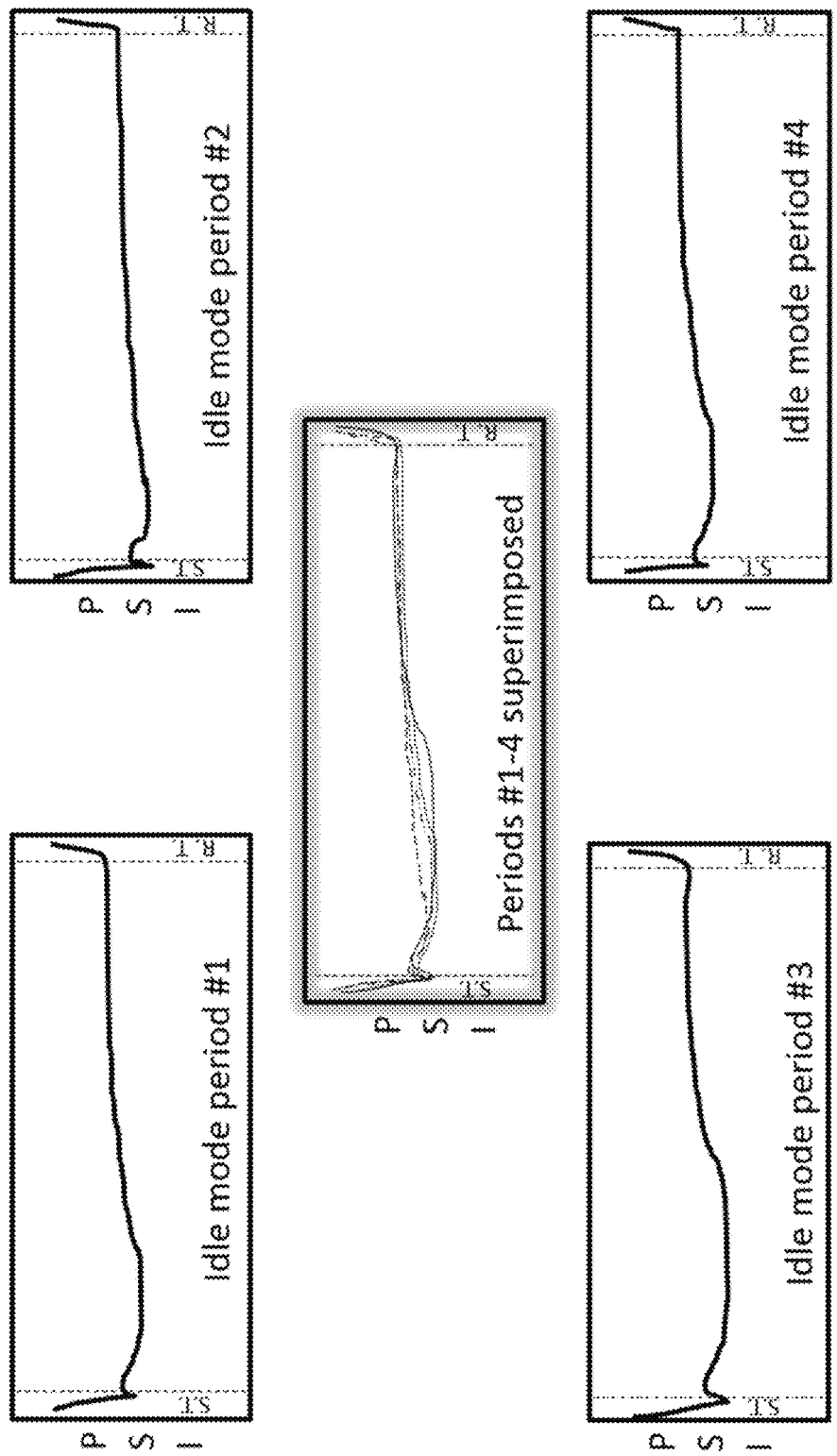
FIG. 16 is a graphical depiction of the characteristic pressure profile repeatability that often occurs during a typical pipeline system's idle (not transporting) mode.

As shown in FIG. 15, small pipeline leaks often result in a subtle leading edge decay signatures (non-abrupt), therefore, IMA examines nodal potential energy behavior over a brief period to determine loss of mass from the pipe segment. The idle mode pressure profile is often highly repeatable at a node as illustrated in FIG. 16, representing typical segmental idle mode repeatability.

Figure 17:
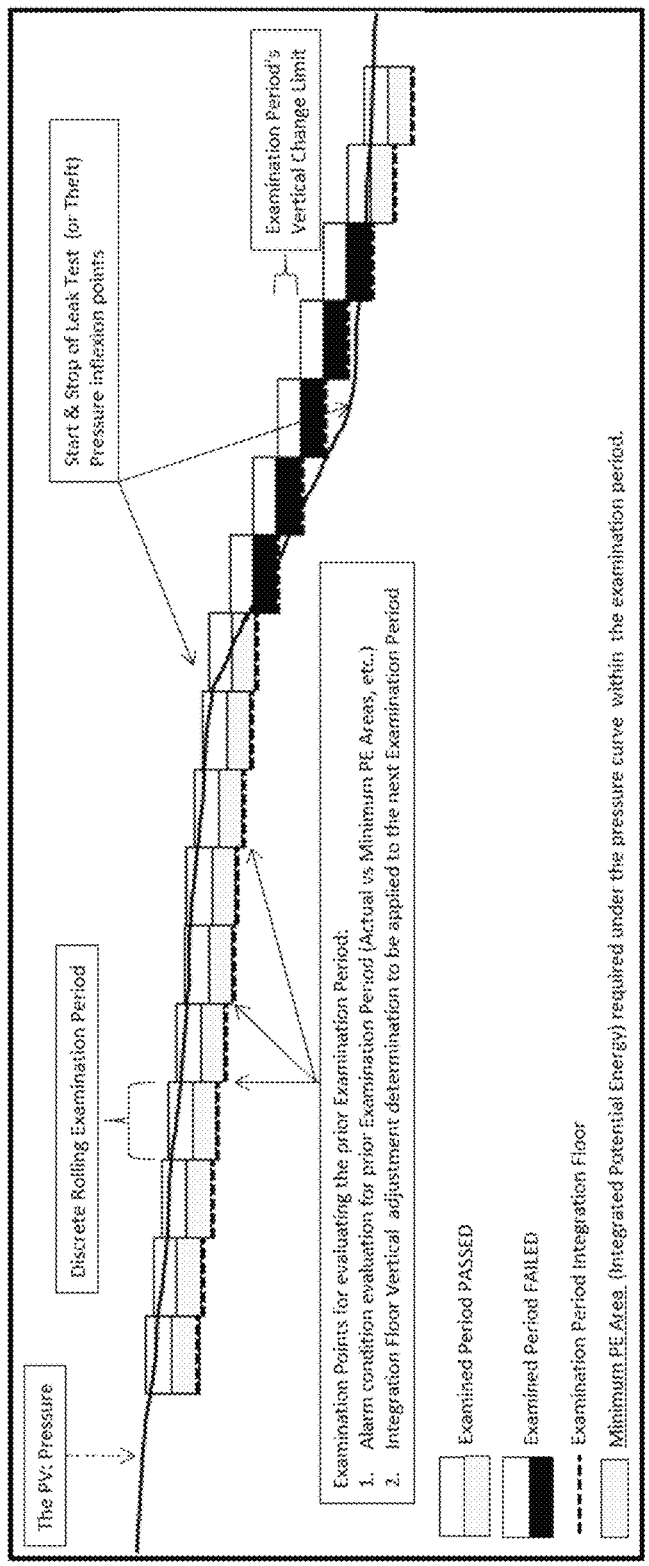
FIG. 17 is a graphical depiction of the IMA application's theory of operation.
Figure 18:
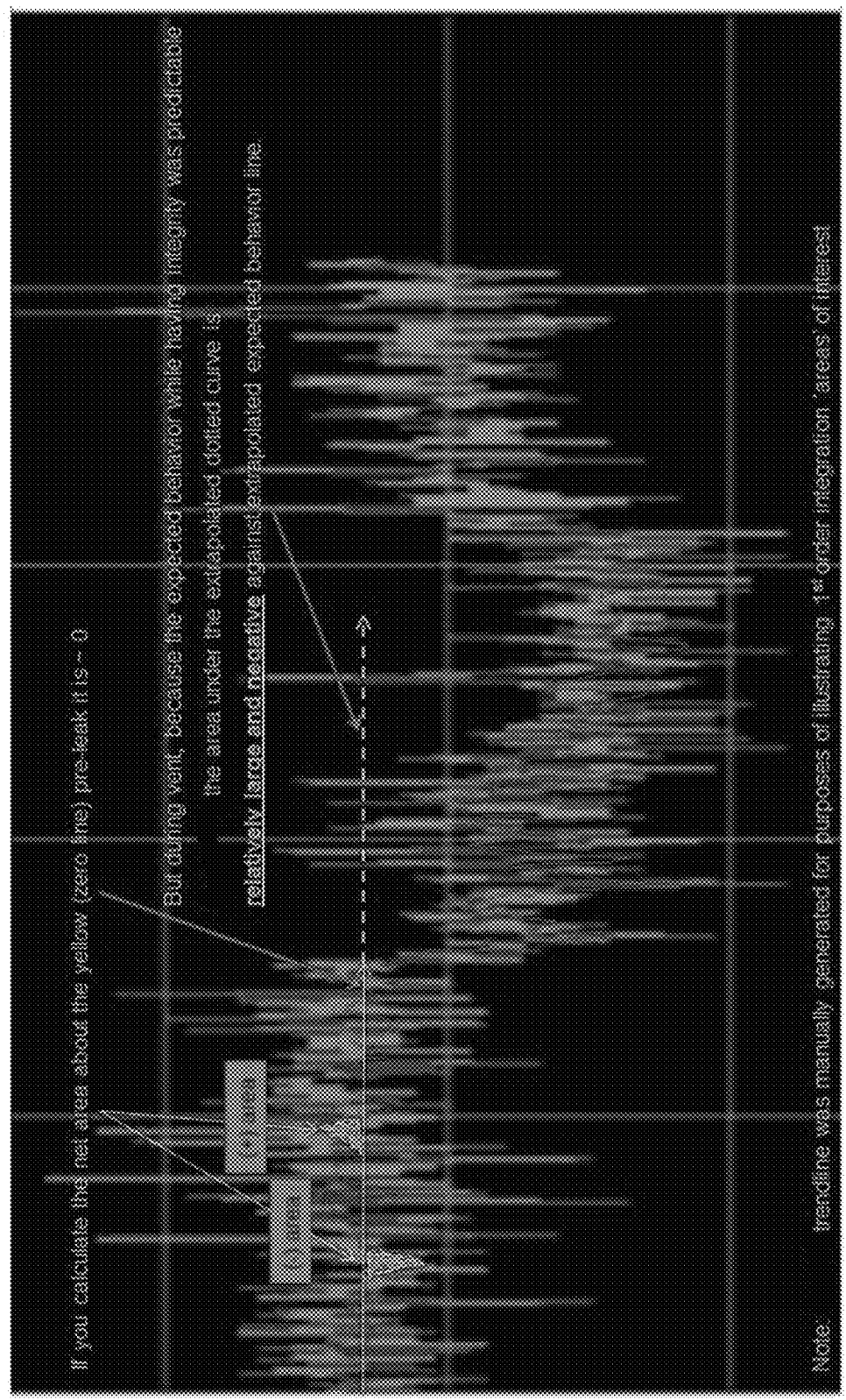
FIG. 18 is a graphical depiction of the IMA application's high speed integration along the idle mode's pressure signal during diurnal fluctuations and normal pressure signal noise activity.

Two IMA representative analysis methods will now be described. This analysis should be performed for each analog input at the nodal fidelity (e.g. SP, DP, etc. to be sampled and analyzed at the highest fidelity available). The first method includes potential energy (PE) integration between the process variable and its extrapolated integration floor. The integration floor is comprised of a series of discrete integration baseline steps calibrated for effectiveness to the dynamic nature of the subject process (especially the PV's normal signal noise, block or check valve seepage, etc.) as shown in FIG. 17. In other words, the integration floor is the baseline from which the rolling examination periods are integrated from up to the process variable value over the time duration of the examination period. The second method analyzes a rolling sum of PE deltas above and below the process variable to a moving average value of the process variable. Moving average is the average process variable value calculated on rolling intervals of discrete time periods or for a fixed process variable sample set size The moving average result for the current evaluated time period or process variable sample set is applied to the next examination period over a discrete period of time or sample set as shown in FIG. 18. The extrapolated moving average steps are calibrated due to the dynamic nature of the subject process in light of signal noise, valve seepage, etc.

The first method of idle mode analysis applies a series of periodic integration processes between an extrapolated integration floor and the real time pressure signal (FIG. 17). A small loss of mass results in a relatively large loss of potential energy or restoring force when integrated above a rolling integration floor calibrated to be within suitable proximity to the real-time pressure variable during successive examination periods. The initial value of this extrapolated floor will be calculated using a non-discard offset parameter. The non-discard offset is an assigned value that is a function of the pressure signal's normal idle mode, pressure noise character, daily/seasonal thermally induced pressure changes, and/or the subject pipeline segment's valve sealing effectiveness when in a normal idle mode condition. The more stable and flat the process variable the smaller the non-discard offset value will be in order to 'magnify' the loss of potential energy resulting from a loss of material. The initial extrapolated integration floor will be set at the current pressure value less the non-discard offset. The initial value of successive extrapolated floors should seek to maintain this constant non-discard offset from the moving average pressure signal, subject to certain constraints.

Some sample inputs to idle mode analysis application routine include pipeline mode configuration from SCADA, examination period (typically 30-60 seconds), integration frequency, e.g. once every examination period, non-discard offset (in psi), floor change limit (in psi), absolute floor threshold (in psi), and minimum required integration (area) change limit.

As illustrated in FIG. 17, during each examination period the extrapolated integration floor for the next examination period is determined. The integration floor for each successive examination period should seek to maintain a constant non-discard offset from the moving average pressure signal of the prior examination period, except that, the maximum change in extrapolated floor per examination period will be set via a function of the pipeline modal key and a calculated coefficient based upon near term behavior. That is, greater near term pressure fluctuation implies a greater maximum change in the extrapolated floor is allowed, in the same direction, up to the floor change limit to account for diurnal or other normal PV normal noise changes over the idle mode period. The allowance for the application to dynamically modify rolling integration floor change as the process undergoes normal idle mode behavior swings significantly enhances reliability. The dashed lines in FIG. 17 for the series of examination period "FAILS" show where the extrapolated floors are limited (or clipped) for each failed examined period over the length of the theft/leak event. The floor change limit intentionally clips the integration floor drop in order to prevent the integration floor from "outracing" the theft/leak pressure decay. The integration floor change limit, along with other IMA parameter calibrations and constraints, are derived directly from empirical reviews of the normal idle mode process variable behavior.

Based upon current examination period integration between the integration floor and the pressure signal (the actual calculated PE area), establish the next examination period minimum required integration area between the floor and pressure signal (the ideally expected PE area to be calculated during the next examination period based on the actual area in the most current examination period). The minimum required integration area for the next examination period is the minimum required integration for the current examination period less the integration % change limit. Then one can compare the integration between the integration floor and pressure signal (area) versus for the current examination period to the minimum required area for the current examination period as determined above. The system generates an alarm if the actual area under the curve for the current examination period is less than the minimum required area under the curve for the current examination period.

The second method involves continuous integration between the pressure signal's extrapolated moving average and the real-time pressure signal. The moving average result for the current evaluated time period (or process variable sample set) is applied to the next examination period over a discrete period of time (or sample set). For this method, IMA establishes the integration baseline by generating an extrapolated moving average pressure signal. Continuously repositioning the x-axis (integration baseline) at this moving average pressure level, subject to maximum movements allowed. FIG. 18 illustrates this concept with the (+) areas above the moving pressure average (horizontal arrow from which integrations between it and the real-time pressure signal occurs) and the (−) areas below it. Thus, values above the integration baseline (i.e. extrapolated moving average) are positive and those below are negative.

Integrating (or accumulating) the pressure with respect to time provides a useful analog detection signal of the change in potential energy within the pipe segment over time. In a closed pipeline network the potential energy is constrained to relatively narrow limits over analytically practical periods of time. If the potential energy change results in the detection signal crossing a dynamic threshold, then an alarm condition is satisfied. In the example provided in FIG. 19 the change is negative, but the dynamic threshold could also be positive for detecting the termination of a product theft event by closing the fluid extraction valve or when monitoring a pipeline segment in a partial vacuum condition. After the dynamic threshold is crossed, an IMA alarm is generated. Some sample inputs to the second method includes pipeline mode, dynamic threshold floor and ceiling, dynamic threshold coefficient, and array size.

Figure 19:
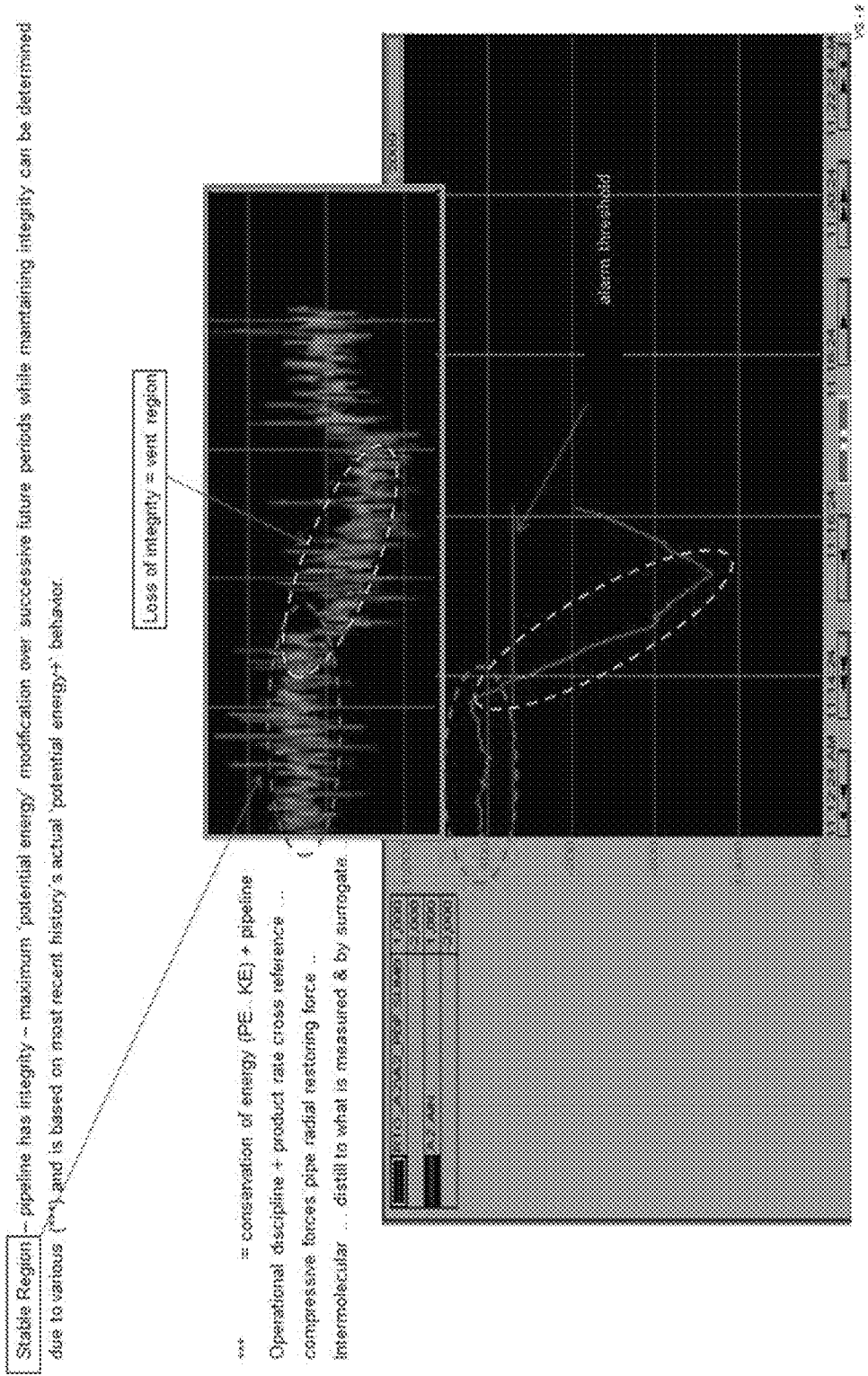
FIG. 19 is a graphical depiction of the IMA application's high speed integration detection signal and alarm threshold value as they respond to a small controlled leak test.

The integration baseline is positioned by creating a moving average of the pressure as shown by the solid and dashed arrows in FIG. 18. Next, a running detection signal (such as continuously updated PE change value) is created with the result from the baseline integration as shown in FIG. 19. The integration baseline is continuously repositioned based upon the updating moving average pressure with discrete integration baseline lengths (time period of fixed sample set number) at the moving average pressure level resulting from extrapolating the process variable's actual moving average value from the prior examination period. The PE change detection signal is then inputted into a dynamic threshold and alarm routine. FIG. 19 shows the PE detection signal breaking thru the alarm threshold quickly following a small controlled crude oil leak test. The PE detection signal's high negative slope in FIG. 19 is the result of accumulating change in the real-time pressure signal during a small controlled crude oil leak test over a brief time period. The detection signal crosses the alarm threshold in less than 1 minute after the controlled leak test is initiated in FIG. 19.

Figure 20:
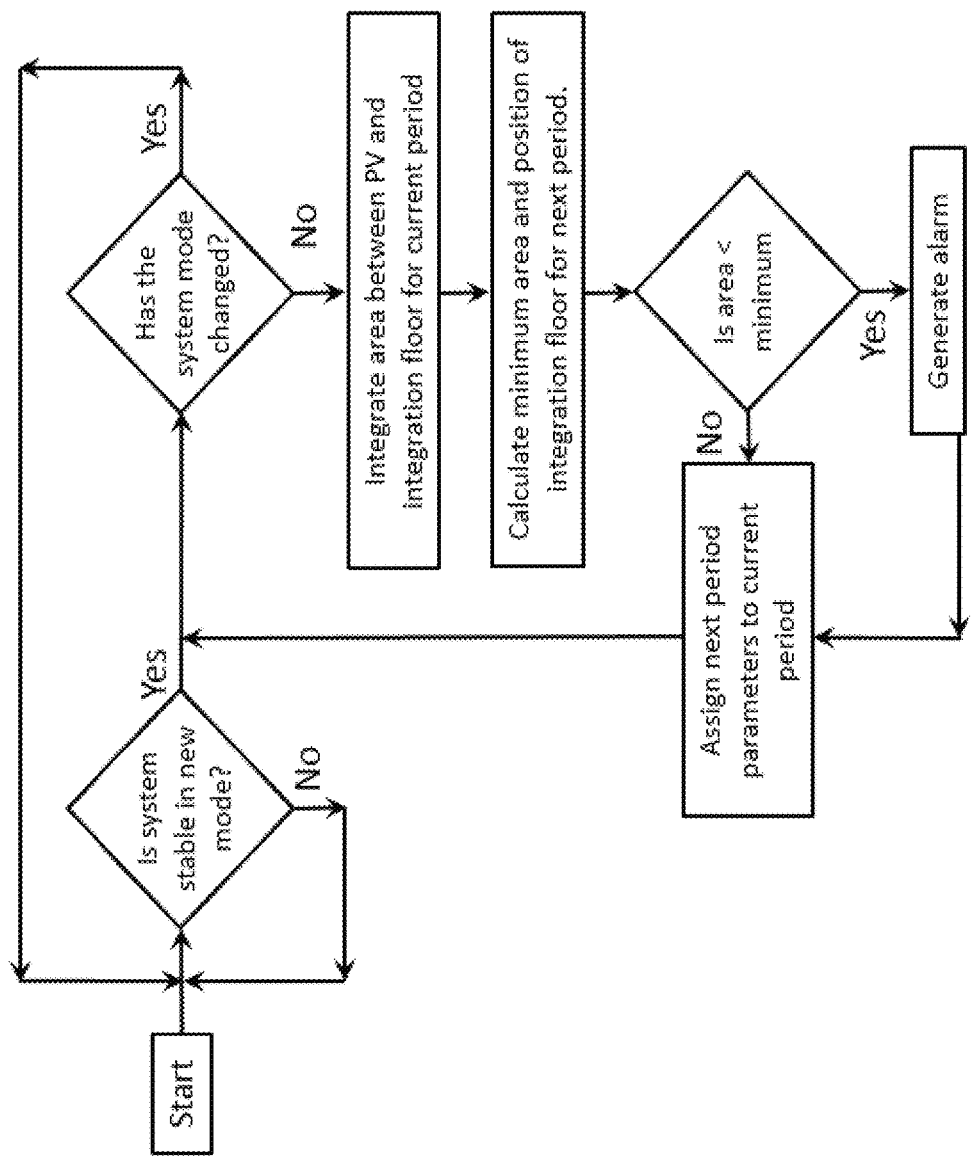
FIG. 20 is an exemplary embodiment of one the logic flow in one of the aspects of the present techniques.

FIG. 20 shows an example decision analysis RTO 210 can perform to provide idle mode analysis. At the start and after sensing a pressure change, RTO 210 determines whether the system is stable in a new mode. If yes, then it determines if the system mode has changed. If the mode has not changed, then RTO 210 will integrate the area between the PV and integration floor for the current examination period and calculate the minimum area and position the integration floor for the next examination period. If area is less than the minimum acceptable area, then an alarm is generated. If it is more than the minimum acceptable area, then the next examination period parameters are applied to the current period and the process starts over again.

Figure 14:
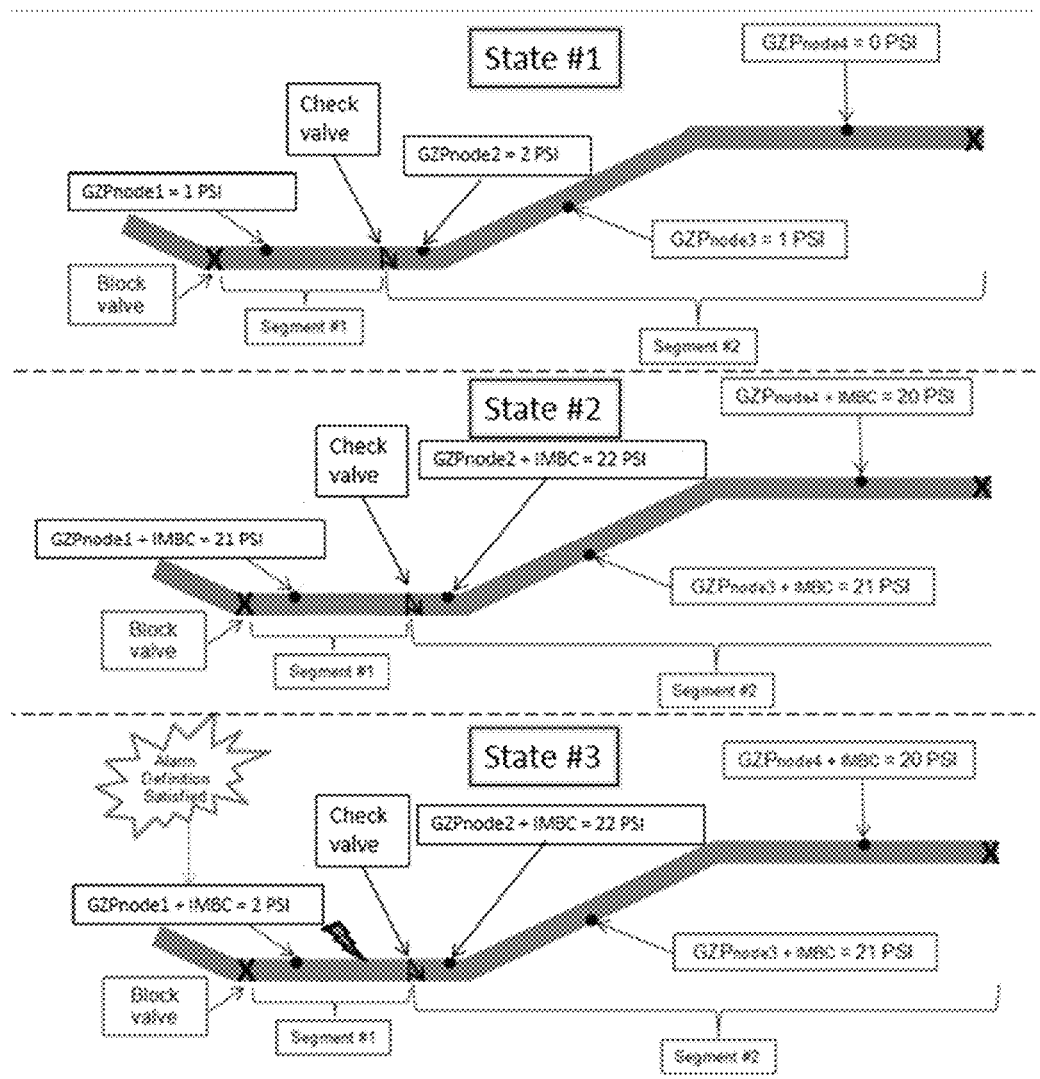
FIG. 14 is an exemplary embodiment of the application's Idle Mode Analysis (IMA) "pressure blanket" design criterion in one of the aspects of the present techniques.

In a third mode, idle mode analysis can include an idle mode pressure blanket. The idle mode pressure blanket is value added to gravity zero pressure at each pressure sensing node. FIG. 14 provides a simple graphical description of relative Gravity Zero Pressures (GZPs) in two pipe segments (Segment #1 & Segment #2) that are fully filled, unpressurized (no tank head, etc.), containing effectively sealing block and check valves having the pressure measurements at each monitored pressure transducer denoted by "GZPnode (x) . . . =Y PSI). FIG. 14 shows a pipeline section with 2 isolated segments (segment #1 and segment #2) in 3 different states. State #1 is the natural condition of the subject pipe section. State #2 is the subject pipe section with RTO 210's idle mode pressure blanket applied (+20 psi in the example). State #3 shows the subject section after a loss of integrity has occurred and with the RTO 210 alarm condition satisfied.

Together, States #1, #2, and #3 are intended to illustrate the simplicity and strength of idle mode detection methods when the mechanism for detection success is properly 'preconditioned'. In this case there are good but imperfect— note differences in pressure across four pressure nodes— block valves. The idle mode pressure blanket for this section of pipe=+20 PSI. In the example shown, each segment is designed to maintain a small positive pressure blanket so a simple and effective idle mode alarm definition could be applied as $X<=(GZPnode(x)+5)$ PSI=alarm condition, where in this example GZPnode1=2 PSI in State #3.

The RTO 210 pressure blanket method discussed here is a simple pressure 'floor' that will be determined based on empirically determined GZPs (Gravity Zero Pressures). GZP is simply the pressure value at a monitored node when the pipe section of interest is fully filled, fully relaxed (no trapped pressure above gravitational loading), and normally isolated. The idle mode pressure floor will be set at a value that the pressure would fall below only in exceptional cases (alarm worthy conditions). Each node will read a certain narrow and predictable pressure range when the section is fully filled, relaxed, and normally isolated. Each node's pressure reading in the idle, filled, and relaxed condition will be highly predictable and fall within a narrow pressure band. The actual repeatable pressure band is primarily a function of pressure instrument location along the pipe section's length (position along pipeline's topographical profile), gravitational loading (due to elevation changes and specific pressure monitor locations), valve types/locations, pipe section length, and product assay (specific gravity).

Consider the utility in and simplicity of a design criterion requiring that when in idle mode this section of the pipeline system (segments #1 & #2) is required to trap 20 PSI above GZP. This straightforward design criterion enables a critical idle mode loss of integrity detection capability. One important reason that effective idle mode analysis techniques are needed is that it is typically easier to detect smaller loss of integrity conditions in the idle mode than it is in the transporting mode (primarily due to lower normal noise levels, absence of fluid driver action, and fewer/no operational event disturbances). With the appropriate enabling criteria and idle mode threat detection application a pipeline that realizes a small integrity loss during the transporting mode that was beneath the detection sensitivity of its run mode threat detection routine(s) would have an opportunity to identify the issue after the pipeline system is shutdown and enters the idle mode. Pipeline control centers could use this information to help prevent restarting an impacted pipeline system's drivers and actively feeding the affected segment new fluid material possibly resulting in additional loss of containment.

The difference between the RTO 210 alarm definition's pressure value and the idle mode pressure blanket value allows for the nodal pressures in the idle segment(s) to naturally vary (daily thermally induced pressure variations) without activating excessive nuisance alarms. The pressure blanket 1) acts as a deadband allowing for naturally occurring pressure variations without excessive nuisance alarm activations, and 2) adds pack to the idle segment so that if a loss of integrity occurs there will be an internal segment pressure movement towards the ambient condition. If the segment is not compressed or in vacuum relative to the ambient environment and both the pressure monitor and a loss of integrity occur near that position, then threat detection is challenged by the inability of the pressure monitor to sense a pressure movement from the internal condition toward the external pressure condition). The exact alarm definitions, corroborating PV reactions, and GZP criteria would be calibrated to each unique pipeline segment's empirically determined normal idle mode pressure behavior when known integrity exists.

As discussed above, the system in accordance with the present invention is effective in managing the generation of alarms in order to reduce the number of false alarms. In addition, it is contemplated that the present invention is useful in connection with diagnosing destabilizing events and recommending or automatically executing potential remedial measures. As discussed above, the system is useful in identifying the presence and location of both high level and lower level destabilization events. The control center 126 can evaluate the data which resulted in the generation of an alarm for a destabilizing event via an expert based pipeline diagnostic subroutine that considers the current destabized character of the pipeline against the expert system's empirical knowledge of what the current mode's hydraulic character should look like while cross refernceing all SCADA-known setpoint and equipment status against this preferred and expected character, the expert system could then automatically execute a corrective measure algorithm or, if preferable, issue a corrective measure notice to the human to address the low level alarm before the lower level destabilizing event escalates into a high level destabilizing event with potential catastrophic impact on the pipeline. It is also contemplated that the control center 126 can initiate a remedial or corrective measure to respond to destabilizing events to maintain stable operation.

It will be apparent to those skilled in subjects related to the art that various modifications and/or variations may be made without departing from the scope of the present invention. While the present invention has been described in the context of a pipeline, the present invention is not intended to be so limited; rather, it is contemplated that the present invention can be used in piping found in refining and petrochemical processing operations, upstream and exploration operations, and any other operation outside of the oil and gas field that is concerned with managing the stable operation of a pipeline and the fluids flowing therethrough. Thus, it is intended that the present invention covers the modifications and variations of the method herein, provided they come within the scope of the appended claims and their equivalents.

Appendix A

Please note in the pseudo code below lines marked with *** relate to other sections of the text, which is included below under the respective headings. References to the term "trigger" refer to pressure wave detection.
RTO Event Detection

```
On a one minute cycle, for each pipeline
    Calculate the line balance divergence slopes ***(CLBDS)
    Store line flow data ***
    Log operational event detections ***(LOT)
    If trigger settling timer not in progress
        If (at least one trigger Change of State (COS) has occurred
        during 30 second timer)
            Start the trigger settling timer
            Start the upstream and downstream pressure decay timer
            Save the current line flow value
            Start the line flow divergence timer
            Save the current calculated line balance divergence
            slope value.
            Start the line balance divergence timer
        Else
            Do nothing and continue
    Else (trigger settling timer in progress)
        Decrement the trigger settling timer counter.
        If the trigger settling timer counter is 0 (timer expired)
            Process triggers ***(PT)
            Create incident report ***(CIR)
            If (bracketing triggers found)
                Recalculate the line flow divergence timer by
                subtracting the settling time value from the
                Divergence Stop Time in the Distance Type structure.
                Recalculate the line balance divergence timer by
                subtracting the trigger settling time from the Line
                Balance Divergence Time plus the Divergence
                Imbalance value.
            Else If (one trigger found)
                Cancel the downstream pressure decay timer.
        Else
            Do nothing and continue
```

For all upstream and downstream pressure decay timers in progress. It's possible that there could be both upstream and downstream pressure decay timers in progress for the same pipeline, one set of timers for the current incident and one set of timers for the previous incident. If a previous timer is in progress, then a new incident had to have occurred before the existing pressure decay timer expired.

```
If (an operational trigger or a usual suspect has just occurred)
    Set the trigger in progress flag to False for all pressures
    Set the pressure decay status to Aborted for all in progress pressures
    Cancel the upstream pressure decay timer.
    Cancel the downstream pressure decay timer, if the timer is active.
    Set the associated Upstream Pressure Decay multi-status (used to drive the Incident
    Report) to "ABORTED". The Incident Report alarm level will not be updated.
    Set the associated Downstream Pressure Decay multi-status (used to drive the
    Incident Report) to "ABORTED", if the timer is active. The Incident Report alarm
    level will not be updated.
Else
    Decrement the upstream pressure decay timer counter.
    Decrement the downstream pressure decay timer counter, if the timer is active.
If (there is pressure decay on the upstream pressure)
    Cancel the upstream pressure decay timer.
    Update the incident report ***(UIR)
If (there is pressure decay on the downstream pressure and the timer is active)
    Cancel the downstream pressure decay timer.
    Update the incident report ***(UIR)
```

For all line flow divergence timers in progress. It's possible that there could be two line flow divergence timers in progress for the same pipeline, one timer for the current incident and one timer for the previous incident. If a previous timer is in progress, then a new incident had to have occurred before the existing line flow divergence timer expired.

```
If (an operational trigger or a usual suspect has just occurred)
    Cancel the line flow divergence timer
    Set the associated Line Flow Divergence multi-status (used to drive
    the Incident Report) to "ABORTED". The Incident Report
    alarm level will not be updated.
Else
    Decrement the line flow divergence timer counter.
    Determine the line flow divergence ***(DLFD)
    If (there is line flow divergence)
        Update incident report ***(UIR)
```

For all line balance divergence timers in progress. It's possible that there could be two line balance divergence timers in progress for the same pipeline, one timer for the current incident and one timer for the previous incident. If a previous timer is in progress, then a new incident had to have occurred before the existing line balance divergence timer expired.

```
If (an operational trigger or a usual suspect has just occurred)
    Cancel the line balance divergence timer
    Set the associated Line Balance Divergence multi-status (used to
    drive the Incident Report) to "ABORTED". The Incident
    Report alarm level will not be updated.
Else
    Decrement the line balance divergence timer counter.
    If the line balance divergence counter is 0 (timer expired)
        Determine the line balance divergence ***(DLBD)
        Update the incident report ***(UIR)
    Else
        Do nothing and continue looping
On a thirty second cycle, for each pipeline
    Check for a trigger ***(CT)
    Calculate pressure slopes ***(CPS)
```

(UUS)—Update Usual Suspects

This function is called by Event Detection whenever a usual suspect point changes state This function is used to update the usual suspect timestamp in the real-time list of usual suspect points. This real-time list is used by the Is a Usual Suspect function in order to determine if an trigger is a usual suspect or not.

```
Loop though all the points defined in the real-time usual suspect list of points
  Get the current time last of the usual suspect point.
  If the time last just occurred (within Usual Suspect Just Occurred Time)
    Set a local variable to know that we found at least one usual suspect point that just
    recently undergone COS.
    If the usual suspect point is a binary or multi-status point
      Get the state of the usual suspect binary or multi-status point
    Else
      Continue
    If the state of the binary or multi-status point is a state defined in the real-time array
    or it is an analog point
      Update the time last value in the time last round robin array for the real-time usual
      suspect points. The reason we keep a configurable round robin array of time last
      values for each usual suspect is because some of the usual suspects will repetitively
      COS in a short period of time.
    Else
        Do nothing and continue looping
  Else
    Do nothing and continue looping
```

If we did not find a recent time stamp on at least one of the usual suspect points in the real-time list, then output an error message to the RTO log file because maybe there is a problem with the derive block or the Usual Suspect Just Occurred Time variable needs to be tuned.

(CT)—Check for a Trigger

This function is used to check for an initial trigger.

```
Loop through all TRIGGER pressures for the passed in pipeline
  Get the time last of the binary reporting the TRIGGER pressure
  Make sure the trigger was not previously processed (look in last array of triggers gathered).
  If trigger was not previously processed
    If ((time last of the BINPNT + edTriggerJustOccurredMaximumTime) > current time)
    and ((time last of the BINPNT + edTriggerJustOccurredMinimumTime) < current time)
    and Is a Usual Suspect ***(IUS) returns FALSE)
      Found a trigger.
      Get all the trigger analog values for the trigger pressure and store the analog trigger
      values in a real-time array.
        • trigger wave amplitude
        • trigger hours after midnight
        • trigger minutes after the hour
        • trigger milliseconds after the minute
      Log a statement to the operation log file.
      Return TRUE.
    Else
      Do nothing and continue looping
  Else
    Do nothing and continue looping
No trigger found, return FALSE.
```

(GLFD)—Get Line Flow Data

This function is called by Event Detection every minute. This function is used to get the sum of the line flow (flow rate) in values and subtract them from the sum of the line flow out values and the return the result in order to determine line flow divergence.

```
Loop through all the line flows in the Line Flow structure
  Get the current value on the analog line flow
  If (In Or Out Line Flow = IN LINE FLOW)
    Add this value to the IN summation variable.
  Else
    Add the value to the OUT summation variable.
    Store the IN summation variable minus the OUT summation result
    in the Line Flow Divergence Line Flow pseudo analog. This pseudo
    analog is only used for monitoring this line flow calculation.
    Return the IN summation variable minus the OUT summation
    variable.
```

(PT)—Process Triggers

This function is called by Event Detection after the trigger settling time has expired.

This function is used to process all the triggers that occurred during the trigger settling time and process the valid triggers to determine the event location.

Get event location ***(GEL) with the array of triggers found during the trigger settling time to determine the event location.

Log all the information returned to the operation log file.

(IUS)—Is a Usual Suspect

This function is called by Check for a Trigger.

This function is used to determine if the passed in binary trigger was caused by a usual suspect or not.

This function returns TRUE if the passed in binary trigger is caused by a usual suspect. If the trigger was not caused by a usual suspect, then FALSE is returned. If TRUE is returned, then a statement will be logged in the operation log file of why the trigger was caused by a usual suspect. The appropriate timestamps will also be logged so the minimum Delay and Maximum Delay variables in the configuration data can be tuned.

Find the trigger binary ID in the Usual Suspects configuration data list and match on either the Usual Suspects Upstream ID or the Usual Suspects Downstream ID.

If the trigger binary ID was found in the Usual Suspects lists

```
Loop through the Usual Suspects Point Rules list, which are all the usual suspect points for
the trigger.
   If the oclass Type is a MULPNT or BINPNT
      Find the oclass Type, and Sstate1 (if it's not blank) in the real-time usual suspects list
      and get the time last array from the real-time usual suspects list.
      For all the usual suspect time last values in the time last array for the usual suspect
         If (time last of the trigger binary >= (usual suspect time last + minimum Delay)
         AND (time last of the trigger binary <= (usual suspect time last + maximum
         Delay)
            Return TRUE
      Find the oclass Type, Sstate2 (if it's not blank) in the real-time usual suspects list and
      get the time last array from the real-time usual suspects list.
      For all the usual suspect time last values in the time last array for the usual suspect
         If (time last of the trigger binary >= (usual suspect time last + minimum Delay)
         AND (time last of the trigger binary <= (usual suspect time last + maximum
         Delay)
            Return TRUE.
   Else (the oclass Type is a ANAPNT)
      Find the oclass Type in the real-time usual suspects list and get the time last array
      from the real-time usual suspects list.
      For all the usual suspect time last values in the time last array for the usual suspect
         If (time last of the trigger binary >= (usual suspect time last + minimum Delay)
         AND (time last of the trigger binary <= (usual suspect time last + maximum
         Delay)
            Return TRUE.
Return FALSE because the trigger was not caused by a usual suspect
```

(GEL)—Get Event Location

This function is called by Process Triggers, which is called just after the trigger settling timer expires.

This function is used to find the event location based on the passed in triggers. This function will return one of 5 possible conditions. The first condition being the most important and the fifth condition the least important, meaning condition 2 will only be returned if condition 1 could not be met.

1) Bracketing Triggers

The upstream location trigger binary point ID (upstream station)

The downstream location trigger binary point ID (downstream station)

The downstream distance.

Upstream corroboration

Downstream corroboration

Whether the bracketing locations are not spanning another station (next to each other) or spanning another station (not next to each other).

2) One sided Triggers

The location trigger binary point ID (closest station).

Whether the direction is upstream or downstream

3) Same station Triggers

The first location trigger binary point ID (station).

Whether the direction is upstream, downstream, or in the station.

4) One Trigger

The trigger binary point ID (station).

5) Error condition, because the triggers did not fall into one of the above 4 conditions.

If there are no triggers

Log an error because we should not be called unless there is at least one trigger. Return an error condition.

If there is only one trigger

Return the trigger binary point ID (station).

Adjust trigger times to correct for "over midnight" condition. Sort the array of triggers from oldest time to most recent time using the trigger hours after midnight, trigger minutes after the hour, and the trigger milliseconds after the minute values.

The DFC (distance from centre) algorithm used in the "for" loops below will be:

```
DFC = ( (Millisecond time of trigger upstream - Millisecond time of trigger downstream) * (
Wave Speed / Convert Wave Speed Time to Milliseconds) ) / 2 where "Millisecond time"
includes the hour and minute data.
This first set of "For" loops will try to find bracketing triggers that do not span a station.
For A = (1) to (number of triggers - 1)
   For B = (A + 1) to (number of triggers)
      Find the A and B location in the Distances structure.
      If (Stations Location To Each Other = NEXT STATION)
         Determine the DFC using the DFC algorithm above.
         If (DFC >= -((0.5 + Distance Tolerance) * Distance)) AND (DFC <= ((0.5 + Distance
         Tolerance) * Distance))
                              Note: If all measurements are correct, an answer greater
                              than half of the distance is not possible. The tolerance is
                              put in to cover inaccuracies in pipe length definition, and
                              timing.
            Downstream distance = DFC + (0.5 * Distances)
            Upstream station corroboration is set to FALSE
            Downstream station corroboration is set to FALSE
            For the A location (upstream location) see if we have a same station trigger. (If
            this A location trigger is an upstream trigger, see if we have the same station
```

-continued

```
            downstream trigger. Or if this A location is a downstream trigger, see if we have
            the same station upstream trigger).
            If (found the same station for the A location)
               If (Millisecond time of the A location same station downstream trigger >
               Millisecond time of the A location same station upstream trigger)
                  Continue on checking for a valid A - B location (Event not in this
                  segment)
               Else If (Millisecond time of the A location same station downstream trigger <
               Millisecond time of the A location same station upstream trigger)
                  Upstream station corroboration is set to TRUE
               Else {downstream and upstream same station trigger times are the same}
                  Upstream station corroboration is set to TRUE
                  Downstream distance = 0
            For the B location (downstream location) see if we have a same station trigger. (If
            this B location trigger is an upstream trigger, see if we have the same station
            downstream trigger. Or if this B location is a downstream trigger, see if we have
            the same station upstream trigger).
            If (found the same station for the B location)
               If (Millisecond time of the B location same station downstream trigger >
               Millisecond time of the B location same station upstream trigger)
                  Downstream station corroboration is set to TRUE
               Else If (Millisecond time of the B location same station downstream trigger <
               Millisecond time of the B location same station upstream trigger)
                  Continue on checking for a better non spanning A - B location, but use
                  this one if one cannot be found.
               Else {downstream and upstream same station trigger times are the same}
                  Downstream station corroboration is set to TRUE
                  Downstream distance = 0
            Found bracketing triggers.
            Return Bracketing Triggers
               Upstream location
               Downstream Location
               Downstream distance
               Upstream station corroboration status
               Downstream station corroboration status
               Not spanning stations
         Else
            Continue on checking for a valid A - B location
      Else
         Continue on checking for a valid A - B location
This second set of "For" loops will try to find bracketing triggers that span a station.
For A = (1) to (number of triggers − 1)
   For B = (A + 1) to (number of triggers)
      Find the A and B location in the Distances structure.
      If (Stations Location To Each Other = NOT NEXT STATION)
         Determine the DFC using the DFC algorithm above.
      If (DFC >= −((0.5 + Distance Tolerance) * Distance)) AND (DFC <= ((0.5 + Distance
      Tolerance) * Distance))
         Downstream distance = DFC + (0.5 * Distances)
         Upstream station corroboration is set to FALSE
         Downstream station corroboration is set to FALSE
         For the A location (upstream location) see if we have a same station trigger. (If
         this A location trigger is an upstream trigger, see if we have the same station
         downstream trigger. Or if this A location is a downstream trigger, see if we have
         the same station upstream trigger).
         If (found the same station for the A location)
            If (Millisecond time of the A location same station downstream trigger >
            Millisecond time of the A location same station upstream trigger)
               Continue on checking for a better spanning A - B location, but use this
               one if one cannot be found.
            Else If (Millisecond time of the A location same station downstream trigger <
            Millisecond time of the A location same station upstream trigger)
               Upstream station corroboration is set to TRUE
            Else {downstream and upstream same station trigger times are the same}
               Upstream station corroboration is set to TRUE
               Downstream distance = 0
         For the B location (downstream location) see if we have a same station trigger. (If
         this B location trigger is an upstream trigger, see if we have the same station
         downstream trigger. Or if this B location is a downstream trigger, see if we have
         the same station upstream trigger).
         If (found the same station for the B location)
            If (Millisecond time of the B location same station downstream trigger >
            Millisecond time of the B location same station upstream trigger)
               Downstream station corroboration is set to TRUE
            Else If (Millisecond time of the B location same station downstream trigger <
            Millisecond time of the B location same station upstream trigger)
               Continue on checking for a valid A - B location
```

```
            Else {downstream and upstream same station trigger times are the same}
                Downstream station corroboration is set to TRUE
                Downstream distance = 0
         Found bracketing triggers.
         Return Bracketing Triggers
         Upstream location
         Downstream Location
         Downstream distance
         Upstream station corroboration status
         Downstream station corroboration status
         Spanning stations
      Else
         Continue on checking for a valid A - B location
   Else
      Continue on checking for a valid A - B location
This third set of "For" loops will try to find one sided triggers.
For A = (1) to (number of triggers - 1)
   For B = (A + 1) to (number of triggers)
      Find the A and B location in the Distances structure.
      If (Stations Location To Each Other != SAME STATION)
         Determine the DFC using the DFC algorithm above.
         If (DFC is a negative number)
            Found one sided triggers.
            Return One sided Triggers
            Upstream location
            Downstream Location
            The direction is upstream
         Else (the DFC is a positive number)
            Found one sided triggers.
            Return One sided Triggers
            Upstream location
            Downstream Location
            The direction is downstream
      Else
         Continue on checking for a valid A - B location
This fourth set of "For" loops will try to find same station triggers.
For A = (1) to (number of triggers - 1)
   For B = (A + 1) to (number of triggers)
      Find the A and B location in the Distances structure.
      If (Stations Location To Each Other = SAME STATION)
         If (Millisecond time of trigger Downstream > (Millisecond time of trigger Upstream
         + In Station Millisecond Tolerance))
            Found same station triggers
            Return Same station Triggers
            Upstream location
            Downstream Location
            Upstream direction
         Else If (Millisecond time of trigger Downstream < (Millisecond time of trigger Upstream
         - In Station Millisecond Tolerance))
            Found same station triggers
            Return Same station Triggers
            Upstream location
            Downstream Location
            Downstream direction
         Else (the times are equal)
            Found same station triggers.
            Return Same station Triggers
            Upstream location
            Downstream Location
            In the station direction
      Else
         Continue on checking for a valid A - B location
Log an error because the triggers did not fall into any of the above 4 conditions. Return an error
condition.
```

(DPD)—Determine Pressure Decay

This function is called by Calculate Pressure Slopes.

This function determines if there is pressure decay for the pressure trigger passed in.

```
If ((post slope of pressure - pre slope of the pressure + Pressure
Decay Threshold)) < 0)
   There is pressure decay for the passed in pressure.
Else
   There is not pressure decay for the passed in pressure.
```

(DLFD)—Determine Line Flow Divergence

This function is called by Event Detection when the line flow divergence timer is active.

This function determines if there is line flow divergence on the pipeline.

```
If (the current result from Get Line Flow Data > ((the saved result
from Get Line Flow Data + Line Flow Divergence Dead band))
```

```
  The pipeline has line flow divergence
Else
  The pipeline does not have line flow divergence.
  Log all the data as to why there was or was not line flow divergence
  to the operation log file
```

(DLBD)—Determine Line Balance Divergence

This function is called by Event Detection after the line balance divergence timer expires.

This function determines if there is currently a line balance divergence on the pipeline.

```
If ((the saved line balance slope value at the time of the incident) + (Line
Balance Divergence Deadband)) > (the current line balance slope value)
  The pipeline has line balance divergence
Else
  The pipeline does not have line balance divergence
Log all the data as to why there was or was not line balance divergence
to the operation log file.
```

Update the line balance divergence multi-status point based on whether there was a line balance divergence or not.

Recalculate the alarm level using the matrix defined in section 3.1.4 Alarm Level Truth Matrix.

If a lower alarm level is calculated (more severe), then the alarm level multi-status and the alarm declared at time control driving points will be updated (COS) and the Investigation Status multi-status point will be COS with the "OPEN" state.

Log all Incident Report information to the operation log file.

(CLBDS)—Calculate Line Balance Divergence Slope

This function is called by Event Detection every minute regardless of whether a trigger has occurred or not.

This function determines the current line balance divergence slope value.

Get the imbalance values.

Store the delta imbalance value along with the current timestamp in the next entry of an internal round-robin array. With a round-robin array, the oldest value will be discarded once the array is full of entries.

```
If the round-robin array is full of entries
  Compute the slope using the following algorithm:
  Set elapsedMinutes =
    (timestamp of the newest delta imbalance value in the round-robin array) −
    (timestamp of the oldest delta imbalance value in the round-robin array)
    The reason we need to calculate elapsed minutes is because RTO is not always called
    precisely every minute. For example, at the top of the hour more than 1 minute may
    elapse.
  Convert the "seconds" part of the elapsed Minutes value to fractional minutes.
  Set slope Value = (sum of all the delta imbalance values in the round-robin array) /
    (elapsed Minutes)
  COS the Line Balance Divergence Slope analog point with the slope Value
Else
  Do nothing and return.
```

(CIR)—Create Incident Report

This function is called by Event Detection after the Process Triggers call, which is just after the trigger settling timer expires.

This function is used to COS the driving points for the Incident Report custom displays.

Save the current incident report as the previous incident report by COSing the Incidents[1] points with the Incidents[0] points.

COS the Incident Report pseudo points for the current incident using the information returned from Process Triggers.

The current alarm level can be determined using the Alarm Level Truth Matrix. The alarm level may change when the Update Incident Report function is called (line flow divergence timer expires or line balance divergence).

COS the Investigation Status multi-status point with the "OPEN" state.

Log all Incident Report information to the operation log file.

(UIR)—Update Incident Report

This function is called by rtoaapEventDetetion after the line flow divergence timer expires or if a line balance divergence has been determined.

This function is used to update the driving points on the Incident Report custom displays If (called after line flow divergence timer expires)
  Update the line flow divergence multi-status driving point based on whether there was line flow divergence or not.
Else (called after line balance divergence determined)

(SALSN)—Set Alarm Level State Normal

This function is called by Event Detection whenever the investigation status pseudo multi-status point COS or at RTO—ED startup.

This function is used to set the alarm level pseudo multi-status point to "NORMAL", if the investigation status pseudo multi-status point is in the "CLOSED" state.

```
Loop though each pipeline
  Loop through each incident
    Get the current state of the investigation status pseudo multi-status
    point.
    If the current state is "CLOSED"
      Set the alarm level pseudo multi-status point to "NORMAL",
      if it is currently not in the "NORMAL" state.
    Else
      Do nothing and continue looping
  Else
    Do nothing and continue looping
```

(LOT)—Log Operational triggers

This function is called by Event Detection once per minute.

This function is used to check for operational triggers and log the associated analog values to the operational log file.

```
Loop through all trigger pressures for the passed in pipeline
  Get the time last of the binary reporting the operational trigger pressure
```

-continued

```
If ((time last of the BINPNT + Trigger Just Occurred Maximum
Time) > current time) and ((time last of the BINPNT +
Trigger Just Occurred Minimum Time) < current time)
   Get all the trigger analog values for the operational trigger pressure
   and store the analog values in the operational log file.
      trigger wave amplitude
      trigger hours after midnight
      trigger minutes after the hour
      trigger milliseconds after the minute
```

-continued

```
   Mark the trigger in a real-time array to avoid multiple logging
   of the same trigger.
```

(CPS)—Calculate Pressure Slopes

This function is called by Event Detection every 30 seconds.

This function determines the current pressure slope value for all the trigger pressures. It also sets the pre-slope value and determines the post slope values if a trigger occurs on the pressure.

```
Loop through all trigger pressures for the passed in pipeline
   Retrieve the value of the high resolution pressure using the High Resolution Pressure ana-
log
      hardware point.
   If (trigger is in progress for Pressure)
      If (current time > (the time of the trigger + Pressure Decay Stop Time))
         Set the trigger in progress flag to False.
      Else (we are before the stop time)
         Compute the post slope using the following algorithm:
         Set elapsed Minutes = (timestamp of the current high resolution pressure value) −
         (timestamp of the saved high resolution pressure value )
         Convert the "seconds" part of the elapsed Minutes value to fractional minutes.
         Set slope Value = (current high resolution pressure value − saved high resolution
         pressure value) / (elapsed Minutes)
         COS the post slope analog with the slopeValue.
         If (to current time > (the time of the trigger+ Pressure Decay Start Time))
            Call Determine Pressure Decay ***(DPD) determine pressure decay.
            If (there is Pressure Decay)
               Set the trigger in progress flag to False.
               Set the pressure decay status to True.
            Else (there is not Pressure Decay)
               Set the pressure decay status to False.
         Else (we are before the start time)
            Continue.
   If (trigger is not in progress for Pressure)
      Check for an trigger on the pressure. The Check For A Trigger function called in Event
      Detection (30 second timer) is used to know if an trigger has just occurred.
      If (an trigger just occurred on the pressure)
         If (there is a current pressure slope value, round-robin array is full)
            Set the trigger in progress flag to True.
            Set the pressure decay status to Unknown.
            COS the pre slope analog with the current pressure slope value.
            COS the post slope analog with 0.
            Save the current high resolution pressure value and time last and call it the saved
            high resolution pressure value and time last.
            Save the time of the trigger using the time last of the binary point.
         Else (there is not a current pressure slope value, round-robin array is not full)
            Set the trigger in progress flag to False.
            Set the pressure decay status to Aborted.
      Else (an trigger has not occurred on the pressure)
         Continue
   If (the current high resolution pressure value is a new COS)
      Store the current high resolution pressure value along with the time last timestamp of the
      analog point in the next entry of an internal round-robin array. With a round-robin array,
      the oldest value will be discarded once the array is full of entries.
      If the round-robin array is full of entries
         Compute the slope using the following algorithm:
         Set elapsed Minutes = (timestamp of the newest high resolution pressure value in the
         round-robin array) − (timestamp of the oldest high resolution pressure value in the
         round-robin array)
         Convert the "seconds" part of the elapsed Minutes value to fractional minutes.
         Set slope Value = (newest high resolution pressure value − oldest high resolution
         pressure value) / (elapsed Minutes)
         COS the Pressure Slope analog point with the slope Value.
      Else (round-robin array is not full)
         Continue on with next pressure
   Else (the current high resolution pressure value is an old COS)
      Continue on with next pressure
```

The invention claimed is:

1. A method of real time monitoring a pipeline network in a transport state to identify possible destabilizing events in the pipeline network, comprising:
establishing a normal fluid driver shutdown pressure loss profile for a normal fluid driver shutdown in the pipeline network;
deenergizing a fluid driver within the pipeline network;
sensing one or more pressure waves within the pipeline network at predetermined locations within the pipeline network;
using high speed chronological monitoring, determining that the deenergizing occurred after the one or more pressure waves was sensed;
establishing a pressure loss profile for the sensed one or more pressure waves and subsequent deenergizing;
integrating an area under the pressure loss profile for the sensed one or more pressure waves and subsequent deenergizing;
comparing the area under the pressure loss profile for the sensed one or more pressure waves and subsequent deenergizing to an area under the normal fluid driver shutdown pressure loss profile for a normal fluid driver shutdown;
generating an alarm when the area under the pressure loss profile for the sensed one or more pressure waves and subsequent deenergizing is less than an acceptable area.

2. The method according to claim 1, wherein the normal fluid driver shutdown pressure loss profile is an empirically determined pressure loss profile.

3. The method according to claim 1, wherein the normal fluid driver shutdown pressure loss profile for a normal fluid driver shutdown is automatically adjusted based upon at least one of a current operating mode, current operating conditions and current operating events.

4. The method of monitoring a pipeline network according to claim 1, further comprising:
determining a location of the possible destabilizing event in the pipeline network in response to the sensed pressure waves.

5. The method according to claim 1, wherein the high-speed chronological monitoring includes monitoring pressures in pipeline network a frequencies greater than every 500 ms.

6. The method according to claim 5, wherein the high-speed chronological monitoring includes monitoring pressures in pipeline network a frequencies greater than every 100 ms.

7. A method of real time monitoring an idle pipeline network to identify possible destabilizing events in the idle pipeline network, comprising:
establishing a pressure profile for an idle pipeline segment in the pipeline network;
establishing an examination period for the idle pipeline segment;
establishing an integration floor by subtracting a non-discard offset from a current pressure value within the idle pipeline segment;
integrating an area between the current pressure value and the integration floor to establish a minimum required integration area for a subsequent examination period;
integrating the current pressure value and the integration floor for the subsequent examination period;
comparing the two integrated areas to determine whether the integration area between the current pressure value and the integration floor for the subsequent examination period is greater than the minimum required integration area.

8. The method according to claim 7, wherein the pressure profile is an empirically determined pressure profile.

9. The method according to claim 7, wherein establishing the pressure profile includes accounting for at least one of temperature variation, valve sealing effectiveness, and entrapped pressure.

10. The method according to claim 7, wherein the non-discard offset value is determined based on at least one of signal noise, thermally induced pressure changes, valve sealing effectiveness, and operating mode.

11. The method according to claim 7, wherein the examination period is 30-60 seconds.

12. A method of real time monitoring a pipeline network to identify possible destabilizing events in the pipeline network, comprising:
(a) monitoring the pipeline network in a transporting mode to identify possible destabilizing events in the transporting mode of the pipeline network comprising
establishing a normal fluid driver shutdown pressure loss profile for a normal fluid driver shutdown in the pipeline network,
deenergizing a fluid driver within the pipeline network,
sensing one or more pressure waves within the pipeline network at predetermined locations within the pipeline network,
using high speed chronological monitoring, determining that the deenergizing occurred after the one or more pressure waves was sensed,
establishing a pressure loss profile for the sensed one or more pressure waves and subsequent deenergizing,
integrating an area under the pressure loss profile for the sensed one or more pressure waves and subsequent deenergizing,
comparing the area under the pressure loss profile for the sensed one or more pressure waves and subsequent deenergizing to an area under the normal fluid driver shutdown pressure loss profile for a normal fluid driver shutdown, and
generating an alarm when the area under the pressure loss profile for the sensed one or more pressure waves and subsequent deenergizing is less than an acceptable area; and
(b) monitoring the pipeline network in an idle state to identify possible destabilizing events in the idle pipeline network, comprising:
establishing a pressure profile for an idle pipeline segment in the pipeline network,
establishing an examination period for the idle pipeline segment,
establishing an integration floor by subtracting a non-discard offset from a current pressure value within the idle pipeline segment,
integrating an area between the between current pressure value and the integration floor to establish a minimum required integration area for a subsequent examination period,
integrating the current pressure value and the integration floor for the subsequent examination period,
comparing the two integrated areas to determine whether the integration area between the current pressure value and the integration floor for the subsequent examination period is greater than the minimum required integration area.

\* \* \* \* \*